US008591622B2

(12) United States Patent
Gallagher et al.

(10) Patent No.: US 8,591,622 B2
(45) Date of Patent: Nov. 26, 2013

(54) FILTER APPARATUS WITH POROUS CERAMIC PLATES

(75) Inventors: Michael Thomas Gallagher, Corning, NY (US); Keith Leonard House, Corning, NY (US); Steven Bolaji Ogunwumi, Painted Post, NY (US); Patrick David Tepesch, Corning, NY (US)

(73) Assignee: Corning Incorporated, Corning, NY (US)

( * ) Notice: Subject to any disclaimer, the term of this patent is extended or adjusted under 35 U.S.C. 154(b) by 350 days.

(21) Appl. No.: 12/915,972

(22) Filed: Oct. 29, 2010

(65) Prior Publication Data

US 2012/0102902 A1 May 3, 2012

(51) Int. Cl.
*B01D 46/00* (2006.01)

(52) U.S. Cl.
USPC ............ 55/523; 55/482; 55/484; 55/DIG. 30; 210/346; 210/486; 210/487; 210/488

(58) Field of Classification Search
CPC .................................................. B01D 46/0021
USPC ......... 55/483, 484, 523, DIG. 30, 350.1, 482; 210/346, 486, 487, 488
See application file for complete search history.

(56) References Cited

U.S. PATENT DOCUMENTS

| 2,408,130 A | 9/1946 | Cecil et al. ..................... 210/334 |
| 2,426,405 A | 8/1947 | McDermott ..................... 183/47 |
| 2,651,417 A | 5/1953 | Malanowski ................. 210/112 |
| 2,978,108 A | 4/1961 | Strassheim .................... 210/346 |
| 3,064,820 A | 11/1962 | Gillick, Jr. et al. ........... 210/488 |
| 4,272,262 A | 6/1981 | Britt et al. ........................ 55/302 |
| 4,303,050 A | 12/1981 | Platzer, Jr. ..................... 123/549 |
| 4,636,232 A | 1/1987 | McDowell ..................... 55/350 |
| 4,695,300 A | 9/1987 | Takagi ............................ 55/485 |
| 4,940,562 A | 7/1990 | Watanabe et al. ............. 264/234 |
| 5,303,547 A | 4/1994 | Mieville et al. .................. 60/274 |
| 5,326,512 A | 7/1994 | Stillwagon et al. ............. 264/44 |
| 5,470,364 A | 11/1995 | Adiletta .......................... 55/484 |
| 5,645,803 A | 7/1997 | Steenackers et al. ......... 422/177 |
| 5,730,869 A | 3/1998 | Koppe .......................... 210/345 |

(Continued)

FOREIGN PATENT DOCUMENTS

| DE | 290 307 | 2/1916 |
| DE | 198 55 092 | 5/2000 |

(Continued)

OTHER PUBLICATIONS

Lin, Y-J, et al., Alumina/Glass Composites Fabricated by Melt-Infiltration of Glass into Porous Alumina, Key Engineering Materials, vol. 313, 2006, p. 129-138.

(Continued)

*Primary Examiner* — Robert Clemente
(74) *Attorney, Agent, or Firm* — Matthew B. McNutt

(57) ABSTRACT

A filter apparatus comprises a filter stack including a plurality of porous ceramic plates that are axially spaced from one another to define plurality of axially spaced apart radial flow areas. In one example, the filter stack is mounted within a housing. In further examples, the plurality of porous ceramic plates alternate between a first set of porous ceramic plates that are nested with a second set of porous ceramic plates. In still further examples, at least one of the sides of the porous ceramic plates defines a plurality of radial flutes arranged in a radial array.

24 Claims, 12 Drawing Sheets

(56) References Cited

U.S. PATENT DOCUMENTS

| | | | |
|---|---|---|---|
| 5,820,833 A | 10/1998 | Kawamura | 422/174 |
| 6,004,705 A | 12/1999 | Masaki et al. | 430/15 |
| 6,013,118 A | 1/2000 | Matsunuma et al. | 55/282.3 |
| 6,309,544 B1 | 10/2001 | Hurwitz | 210/330 |
| 6,602,325 B1 | 8/2003 | Frost et al. | 95/56 |
| 7,029,634 B2 | 4/2006 | Sherwood, Jr. | 422/177 |
| 7,252,809 B2 | 8/2007 | Bruck et al. | 422/181 |
| 7,318,851 B2 | 1/2008 | Brown et al. | 55/498 |
| 7,350,350 B2 | 4/2008 | Okugawa et al. | 60/297 |
| 7,455,709 B2 | 11/2008 | Ohno et al. | 55/523 |
| 7,473,288 B2 | 1/2009 | Toyoda et al. | 55/282.3 |
| 7,527,671 B1 | 5/2009 | Stuecker et al. | 95/273 |
| 7,559,967 B2 | 7/2009 | Oya et al. | 55/523 |
| 7,563,300 B2 | 7/2009 | Nishiyama et al. | 55/498 |
| 7,582,270 B2 | 9/2009 | Zuberi | 423/210 |
| 7,611,560 B2 | 11/2009 | Ichikawa | 55/523 |
| 8,444,752 B2 | 5/2013 | Beall et al. | 95/273 |
| 2002/0046555 A1 | 4/2002 | Sherwood, Jr. | 55/482 |
| 2004/0176246 A1 | 9/2004 | Shirk et al. | 502/439 |
| 2005/0252631 A1 | 11/2005 | Bardes et al. | 164/349 |
| 2006/0120937 A1 | 6/2006 | Zuberi | 423/215.5 |
| 2007/0065348 A1 | 3/2007 | Ohno et al. | 422/177 |
| 2008/0141638 A1 | 6/2008 | Linhart et al. | 55/520 |
| 2008/0196370 A1 | 8/2008 | Schramm et al. | 55/498 |
| 2008/0202084 A1 | 8/2008 | Lynch et al. | 55/493 |
| 2009/0019823 A1 | 1/2009 | Juliar et al. | 55/472 |
| 2009/0091056 A1 | 4/2009 | Fabbricante et al. | 264/211.1 |
| 2011/0041469 A1 | 2/2011 | Fischer et al. | 55/498 |
| 2013/0058839 A1 | 3/2013 | Miyairi | 422/177 |

FOREIGN PATENT DOCUMENTS

| | | |
|---|---|---|
| DE | 101 28 936 | 9/2003 |
| DE | 102 42 682 | 3/2004 |
| DE | 103 01 034 | 7/2004 |
| EP | 1 930 060 | 8/2007 |
| FR | 2 214 505 | 8/1974 |
| GB | 933178 | 8/1963 |
| JP | 7-26932 | 1/1995 |
| JP | 7-127434 | 5/1995 |
| WO | 01/62365 | 8/2001 |
| WO | 03/048552 | 6/2003 |
| WO | 2005/000446 | 1/2005 |
| WO | 2005/038203 | 4/2005 |
| WO | 2005/123214 | 12/2005 |
| WO | 2005/123219 | 12/2005 |
| WO | 2006/077312 | 7/2006 |
| WO | 2007/012509 | 2/2007 |
| WO | 2007/045621 | 4/2007 |
| WO | 2008/025021 | 2/2008 |
| WO | 2008/111825 | 9/2008 |
| WO | 2008/125475 | 10/2008 |
| WO | 2009/071626 | 6/2009 |
| WO | 2009/071636 | 6/2009 |
| WO | 2010/112542 | 10/2010 |

OTHER PUBLICATIONS

Tian, J., et al., "Fracture strength of melt-infiltrated SiC-mullite composite", Journal of Materials Science 39, 2004, p. 3751-3755.

Tian, J., "Improvement in the Oxidation Resistance of Oxide-Matrix Silicon Carbide-Particulate Composites by Mullite Infiltration", Journal of the American Ceramic Society 86 (1), 2003, p. 1806-1808.

Abstract: Jean, J-H, et al. "Liquid-phase sintering in the glass-cordierite system", Journal of Material Science 27 (6), 1992, p. 1575-1584.

Patent Cooperation Treaty International Search Report for international application No. PCT/US2011/056790; mailing date Oct. 19, 2012, 20 pages.

Apr. 12, 2013 USPTO Non-final Rejection, U.S. Appl. No. 12/915,928, filed Oct. 29, 2010, pp. 1-19.

Jul. 5, 2013 USPTO Final Rejection U.S. Appl. No. 12/915,928, filed Oct. 29, 2010, pp. 1-15.

FILTER APPARATUS WITH POROUS CERAMIC PLATES

FIELD

The present disclosure relates generally to filter apparatus, and more particularly, to filter apparatus including porous ceramic plates.

BACKGROUND

Ceramic honeycomb filters are commonly employed to filter exhaust gases. For example, ceramic honeycomb filters are known to be used to remove particulate and/or gases from the exhaust stream of a diesel engine.

SUMMARY

In one aspect, a filter apparatus comprises a housing including a first fluid port and a second fluid port. A filter stack is mounted within the housing and configured to filter a fluid stream between the fluid ports with the filter stack defining a central flow path in fluid communication with the first fluid port. The filter apparatus includes an outer peripheral flow path in fluid communication with the second fluid port and defined between the filter stack and the housing. The filter stack includes a plurality of porous ceramic plates axially spaced from one another in an axial direction of the filter apparatus by a plurality of spacers to define a plurality of axially spaced apart radial flow areas. Each porous ceramic plate includes a thickness extending between a first side and a second side of the porous ceramic plate. Each porous ceramic plate further includes a central aperture extending through the thickness of the plate, the central apertures of the porous ceramic plates positioned along the central flow path. The plurality of axially spaced apart radial flow areas alternate in the axial direction along the central flow path between a first set of radial flow areas open to the central flow path and closed to the outer peripheral flow path, and a second set of radial flow areas closed to the central flow path and open to the outer peripheral flow path.

In another aspect, a filter apparatus comprises a filter stack including a plurality of porous ceramic plates that each includes a central aperture positioned along a central flow path. The plurality of porous ceramic plates are axially spaced from one another in an axial direction of the filter apparatus to define a plurality of axially spaced apart radial flow areas that alternate in the axial direction between a first set of radial flow areas that are open to the central flow path, and a second set of radial flow areas that are closed to the central flow path. The plurality of porous ceramic plates alternate between a first set of porous ceramic plates that are nested with a second set of porous ceramic plates.

In yet another aspect, a filter apparatus comprises a filter stack including a plurality of porous ceramic plates that each include a central aperture positioned along a central flow path. The plurality of porous ceramic plates are axially spaced from one another in an axial direction of the filter apparatus to define a plurality of axially spaced apart radial flow areas that alternate in the axial direction between a first set of radial flow areas that are open to the first central flow path, and a second set of radial flow areas that are closed to the first central flow path. Each of the plurality of porous ceramic plates include a first side and a second side, with at least one of the sides defining a plurality of radial flutes arranged in a radial array about the corresponding aperture of the porous ceramic plate to increase the filtration surface area of the side with the radial flutes.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION

Figure 1:
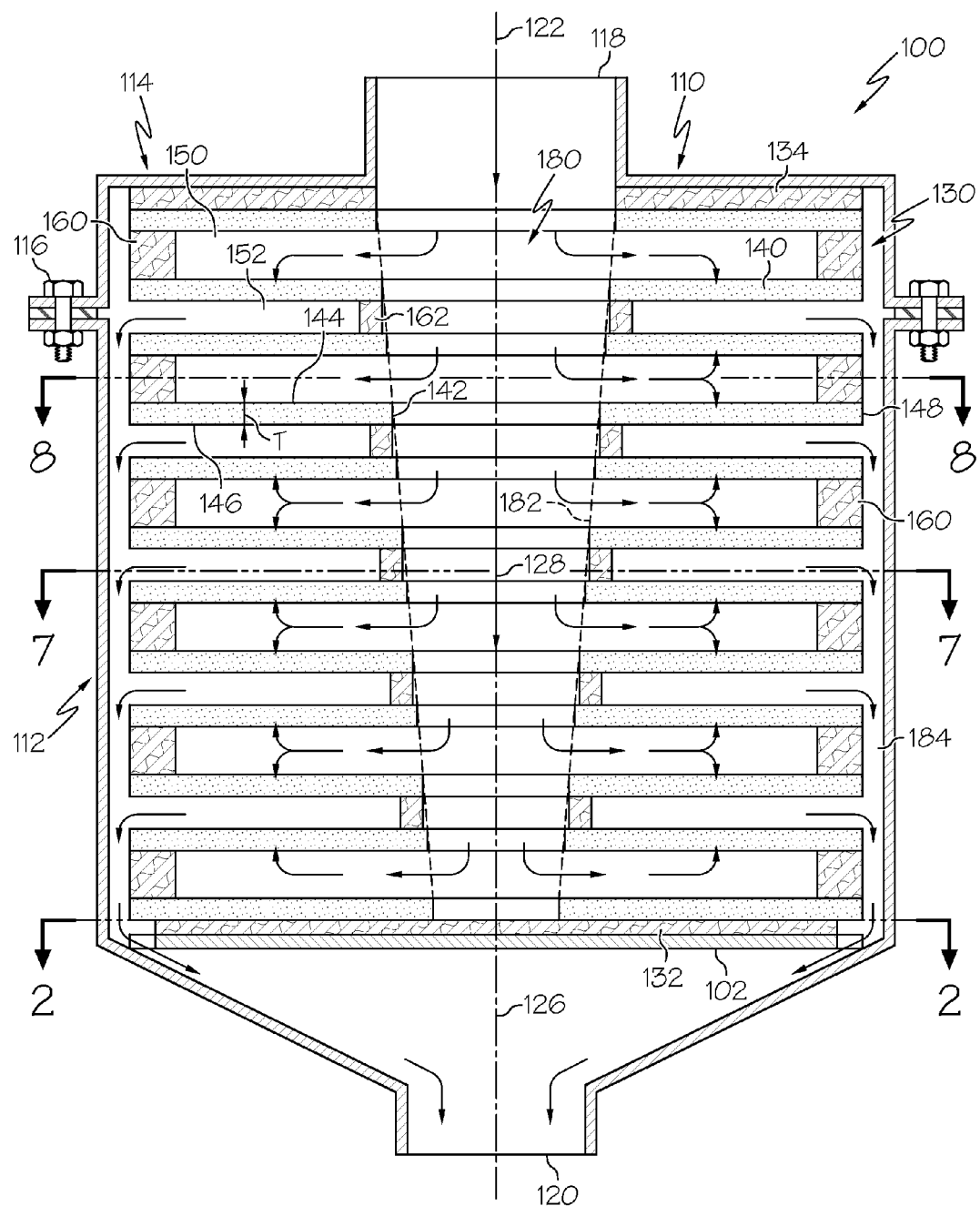
FIG. 1 illustrates a vertical cross-sectional view of an example filter apparatus.

The present invention will now be described more fully hereinafter with reference to the accompanying drawings in which example embodiments of the claimed invention are shown. Whenever possible, the same reference numerals are used throughout the drawings to refer to the same or like parts. However, the claimed invention may be embodied in many different forms and should not be construed as limited to the embodiments set forth herein. These example embodiments are provided so that this disclosure will be both thorough and complete, and will fully convey the scope of the claimed invention to those skilled in the art.

Filter apparatus are provided that can include one or more filter stacks and may include an optional housing. For example, FIG. 1 illustrates a vertical cross sectional view of a filter apparatus 100 comprising a filter stack 130 mounted within a housing 110. As shown the housing comprises a single wall housing although double wall or other wall configurations may be provided. A single wall housing may be desirable to allow heat transfer from the single wall to the surrounding environment. Heat transfer from the housing wall can be adjusted to control temperature extremes and/or gradients within the filter stack 130. In further examples, a double wall housing may be desirable to help insulate the filter stack 130 from the surrounding environment. As such, in certain operating environments, the double wall housing may be employed to help maintain a desired maximum temperature and/or temperature gradient of the filter stack 130.

The housing 110 may comprise a single unitary structure to provide a filter apparatus with a simplified design. Alternatively, as shown in FIG. 1, the housing 110 may be constructed from multiple parts that are connected together. For instance, as shown, the housing includes a first housing portion 112 and a second housing portion 114 with corresponding flanges that may be connected together with fasteners 116.

Figure 2:
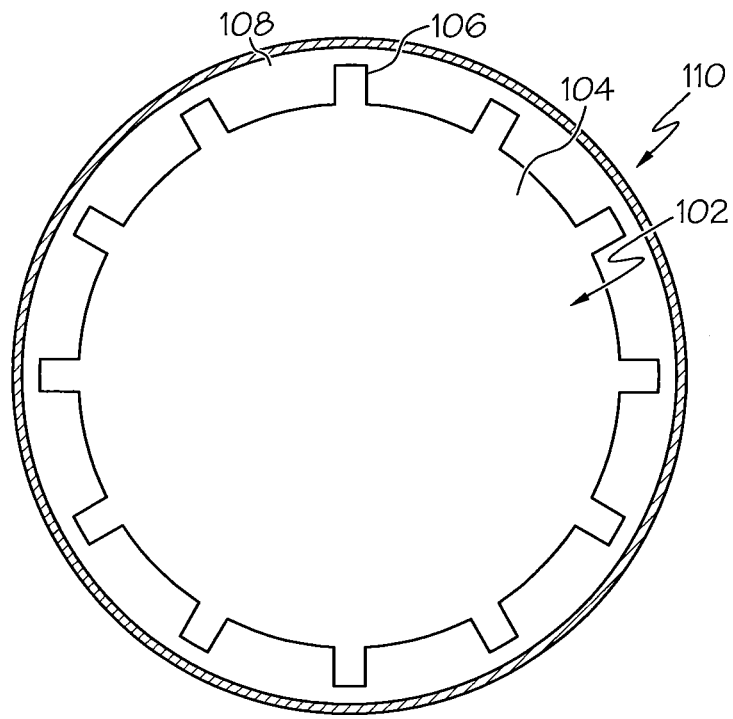
FIG. 2 illustrates a cross sectional view of the filter apparatus along line 2-2 of FIG. 1.

As shown in FIGS. 1 and 2, the housing 110 can be provided with a support plate 102 including a plate body 104 with protrusions 106 designed to engage the housing 110 while defining fluid passage openings 108 to allow the fluid stream 122 to pass therethrough. In further examples, rather than protrusions 106, spacers may be provided to elevate the plate body to allow air passages for the fluid stream. In example embodiments, the support plate 102 can act as a compression plate to help compress the filter stack 130 within the housing 110. For example, the fasteners 116 may be tightened to compress the filter stack 130 between the second housing portion 114 and the support plate 102. In such examples, a first insulation layer 132 may be provided between one end porous ceramic plate 140 and the support plate 102 and a second insulation layer 134 may be provided between an axially opposed end porous ceramic plate 140 and the second housing portion 114. The insulation layers 132, 134 can provide impact, vibrational and or thermal resistance between the filter stack 130 and other portions of the filter apparatus 100.

Figure 7:
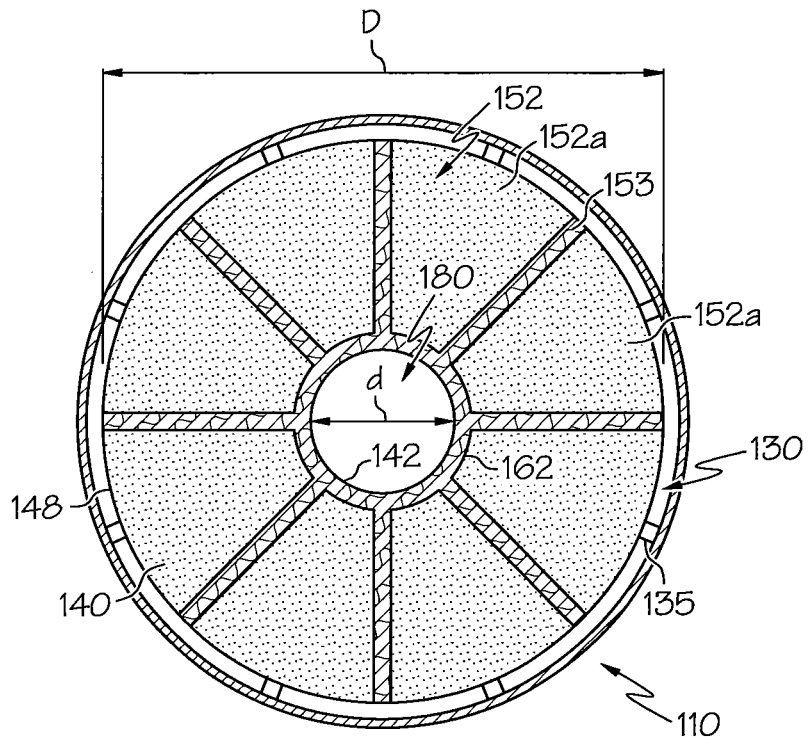
FIG. 7 illustrates a cross sectional view of the filter apparatus along line 7-7 of FIG. 1.
Figure 8:
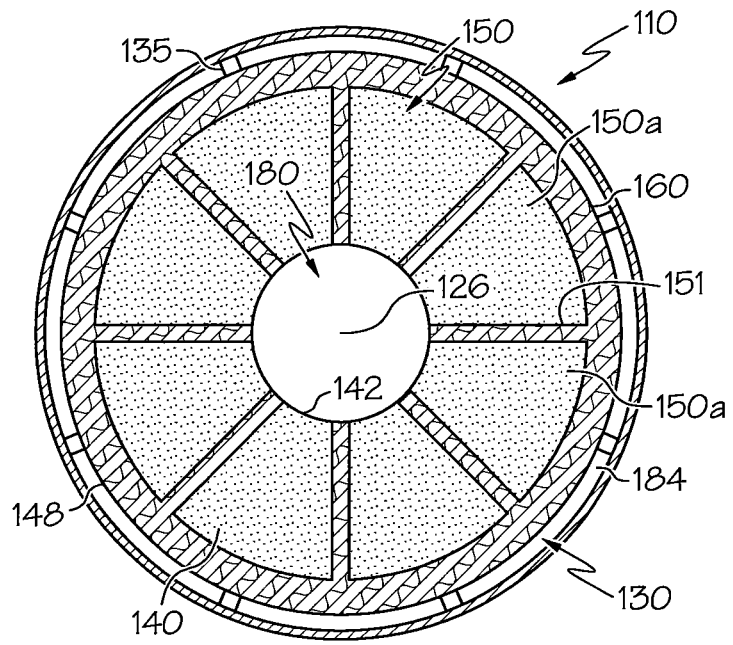
FIG. 8 illustrates a cross sectional view of the filter apparatus along line 8-8 of FIG. 1.

As shown in FIGS. 7 and 8, insulation ribs 135 may be provided between the porous ceramic plates and the housing. As shown, the insulation ribs 135 can comprise elongated strips of material positioned along the axis 126. In further examples, the insulation ribs can comprise spacer blocks, spacer tabs or other constructions designed to space the porous ceramic plates and the housing. The insulation ribs 135, if provided, can help position the filter stack 130 within the housing 110 to help maintain the outer peripheral flow path 184 and/or prevent contact between the porous ceramic plates 140 and the housing 110. In some examples, avoiding contact between the porous ceramic plates 140 and the housing 110 can be desirable to protect the porous ceramic plates from impact forces that may otherwise be imposed by the housing 110. The insulation materials forming the insulation layers and/or insulation ribs may comprise compliant material capable of being deformed, such as resiliently deformed, under axial compression. In one example, the compliant material comprises a ceramic matting material, such as a ceramic paper although other materials capable of maintaining structural integrity under the operating temperatures of the filter apparatus 100 may be used in further examples.

The housing 110 also includes a first fluid port 118 and a second fluid port 120. Either fluid port can be designed to provide an inlet and/or an outlet for a fluid stream 122. For example, as shown in FIG. 1, the filter apparatus 100 is arranged such that the first fluid port 118 provides an inlet for the fluid stream 122 while the second fluid port 120 provides an outlet for the fluid stream 122. The fluid ports 118, 120 may be arranged in a variety of ways. In the illustrated example, the fluid ports 118, 120 are coaxially aligned along an axis 126 of the filter apparatus 100. In further examples, the fluid ports may be axially offset, orthogonal, parallel or otherwise arranged with respect to one another.

As shown in FIG. 1, the filter stack 130 comprises a single filter stack mounted within the housing 110 although two or more filter stacks may be provided in further examples. The filter stack 130 is configured to filter the fluid stream 122 between the fluid ports 118, 120 with the filter stack 130 defining a central flow path 180 in fluid communication with the first fluid port 118. As shown, the central flow path 180 may be configured to extend along the axis 126 of the filter apparatus 100. Moreover, as demonstrated by the dashed lines 182 in FIG. 1, the central flow path 180 may also be inwardly tapered in an axial direction 128 of the filter apparatus 100. In further examples, the central flow path 180 may have other configurations, for example, without a taper or outwardly tapered in the axial direction. Tapering the central flow path inwardly or outwardly in the axial direction may be selected to achieve desirable filter efficiency while minimizing back pressure. For example, inwardly tapering the central flow path in the axial direction of the filter apparatus may reduce the back pressure during filter operation.

The filter stack 130 may be mounted within the housing 110 such that an outer peripheral flow path 184 is defined between the filter stack 130 and the housing 110. In the illustrated example, the filter stack 130 has an outer dimension (e.g., diameter) that is smaller than an inner dimension (e.g., diameter) of the housing 110. The filter stack 130 can be axially aligned within the housing 110 such that the outer peripheral flow path 184 circumscribes the outer periphery of the filter stack 130. In the illustrated example, the outer peripheral flow path 184 comprises a cylindrical area that circumscribes the outer periphery of the filter stack 130. As further shown, the filter stack 130 is mounted within the housing 110 such that the outer peripheral flow path 184 is in fluid communication with the second fluid port 120.

As shown in FIG. 1, the filter stack 130 can include a plurality of porous ceramic plates 140. Each porous ceramic plate 140 can be considered to include a filter profile defined between a first side 144 and a second side 146 of the porous ceramic plate 140. Filter profiles of the porous ceramic plates can be defined by a wide range and combination of characteristics of the porous ceramic plate such as: ceramic material composition, porosity and/or median pore diameter of the ceramic material, plate layering, catalyst loading, plate thickness, size of the central aperture and/or filter surface area of the plate, plate surface topography and/or other characteristics that impact the backpressure, filter efficiency and/or other filter characteristics of the filter apparatus. In some examples, all of the porous ceramic plates are identical to one another such that each porous ceramic plate includes substantially the same filter profile. In other examples, at least one of the plurality of porous ceramic plates has a filter profile defined between the first side and the second side of the porous ceramic plate that substantially changes in a radial direction of the porous ceramic plate. In still further examples, at least two of the plurality of porous ceramic plates of the filter stack have substantially different filter profiles.

The porous ceramic plates 140 can each be formed from the same material composition although at least two or all of the porous ceramic plates may comprise different material compositions. The desired material composition for each plate may be selected by adjusting the ceramic forming batch material. After firing, the composition of the porous ceramic plates may include a wide range of ceramic materials such as ceramic/glass ceramic structures. For example, the ceramic material can comprise a metal oxide crystalline material such as alumina, zirconia, cordierite, mullite, aluminum titanate and/or other materials. In further examples, the ceramic material can comprise a non-oxide crystalline material such as silicon carbide, silicon nitride and/or other materials. In still further examples, the ceramic material can comprise a vitreous material such as VYCOR material or silica. The ceramic material can also be a glass-ceramic or may be a combination of materials mentioned above.

It will be appreciated that various compositions of ceramic materials may be provided to obtain a porous ceramic plate with the desired filter profile between the first side 144 and the second side 146 of the porous ceramic plate 140. In some examples, all of the plates may include the same composition of ceramic materials although two or more of the plates may have a different composition of ceramic materials to provide different filter characteristics at different locations within the filter stack. Moreover, at least one or all of the ceramic plates may have the same or a different material composition as a function of the radial direction from a central portion of the porous ceramic plate. For example, an interior portion of the porous ceramic plate may have a material composition that begins with one material composition at an inner portion of the plate but gradually changes to a substantially different material composition towards an outer peripheral edge of the porous ceramic plate. Providing the porous ceramic plate with a different material composition as a function of the radial direction from a central portion of the plate can provide the porous ceramic plate with a radially varying filter profile that changes the filter characteristics at different radial locations of the porous ceramic plate.

The porous ceramic plates 140 comprise porous ceramic material wherein the porosity of the ceramic plates can range from about 20% to about 80% pore volume, such as from about 50% to about 70% pore volume. The medium pore diameter of the pores can also be selected within the range of from about 2 microns to about 100 microns depending on the particular application. In still further examples, potential applications exist for low porosity (e.g., from about 0% to about 20% pore volume), high strength, ceramic/glass ceramic structures with unique geometries that may be fabricated by a 3D printing process.

It will be appreciated that various porosities and/or median pore diameters may be provided to obtain a porous ceramic plate with the desired filter profile between the first side 144 and the second side 146 of the porous ceramic plate 140. In some examples, all of the plates may include the same porosity and/or median pore diameter although two or more of the plates may have a different porosity and/or median pore diameter to provide different filter characteristics at different locations within the filter stack. Moreover, at least one or all of the porous ceramic plates have a porosity and/or median pore diameter that is the same or different as a function of the radial direction from a central portion of the porous ceramic plate. For example, an interior portion of the porous ceramic plate may have a porosity and/or median pore diameter that begins with at one value but gradually changes to a substantially different value towards an outer peripheral edge of the porous ceramic plate. Providing the porous ceramic plate with a different porosity and/or median pore diameters as a function of the radial direction from a central portion of the plate can provide the porous ceramic plate with a radially varying filter profile that changes the filter characteristics at different radial locations of the porous ceramic plate.

Figure 3:
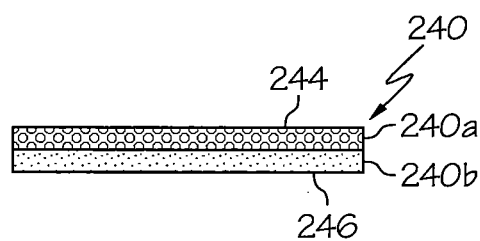
FIG. 3 illustrates a cross sectional view of portions of another example porous ceramic plate that can be used with example filter apparatus.

Each porous ceramic plate 140 includes a thickness "T" extending between a first side 144 and a second side 146 of the porous ceramic plate 140. A wide variety of thicknesses may be provided depending on the particular filter application. Example thicknesses "T" can be from about 10 microns to about 2,000 microns although other thicknesses may be used in further examples. The filter profile of the porous ceramic plate 140 can be substantially the same or vary between the first side 144 and the second side 146 of the porous ceramic plate 140. For example, as shown in FIG. 1, the material characteristics can be substantially the same through the thickness "T" of the material. As such, the filter profile of the porous ceramic plates of FIG. 1 remains substantially the through the thickness "T" of the porous ceramic plate 140. In further examples, at least one of the plurality of porous ceramic plates can include different layers that have different filter profiles. For example, as shown in FIG. 3, a portion of a porous ceramic plate 240 is illustrated that can have the similar or identical features as the porous ceramic plate 140 illustrated in FIG. 1. However, as shown, the porous ceramic plate 240 of FIG. 3 includes a first layer 240a defining the first side 244 of the porous ceramic plate 240 and a second layer 240b defining the second side 246 of the porous ceramic plate 240. The first layer 240a and second layer 240b have a substantially different filter profile defined between the first side and the second side of the porous ceramic plate. For example, as shown, the first layer 240a has a higher median pore diameter than the second layer 240b. In addition or alternatively, the first layer may have a different porosity, material composition or other features to provide each layer with a different filter profile. Moreover, as shown, the thickness of the porous ceramic plate 240 is achieved by two layers although three or more layers may be provided in further examples. Furthermore, the proportional thickness of each layer may change in the radial direction of the plates and/or the plurality of plates in the filter stack may have different layer characteristics.

Figure 4:
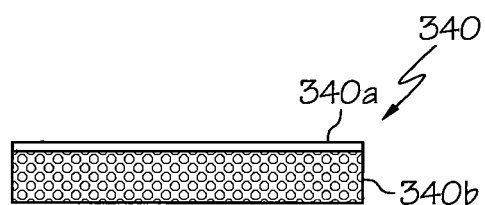
FIG. 4 illustrates a cross sectional view of portions of yet another example porous ceramic plate that can be used with example filter apparatus.

FIG. 4 a portion of a porous ceramic plate 340 is illustrated that can have the similar or identical features as the porous ceramic plate 140 illustrated in FIG. 1. Yet, the porous ceramic plate 340 of FIG. 4 is provided with a relatively thin first layer 340a comprising a catalyst coating of material designed to catalyze with certain gas components that overlays a second layer 340b comprising a porous ceramic material configured to filter particular matter entrained in a fluid stream. As shown, the catalyst is provided as a coating over the porous ceramic material. In further examples, the catalyst can be impregnated within the porous ceramic material. In still further examples, the plates may be formed from nanocatalyst particles using a binder. The material can then be fired at a sufficiently high enough temperature so as not to cause the catalyst particles to sinter (e.g., at a temperature of less that 1100° C.). The catalyst materials may consist of catalyst suitable for NOx removal such as a metal catalyzed zeolites or a metal oxide or mixed metal oxide to promote oxidation of soot and gas species. Such catalyst application may be provided at different concentrations within each plate as a function of the radial direction of the plates and/or may be provided at different concentrations at different plates within the filter stack.

Figure 5:
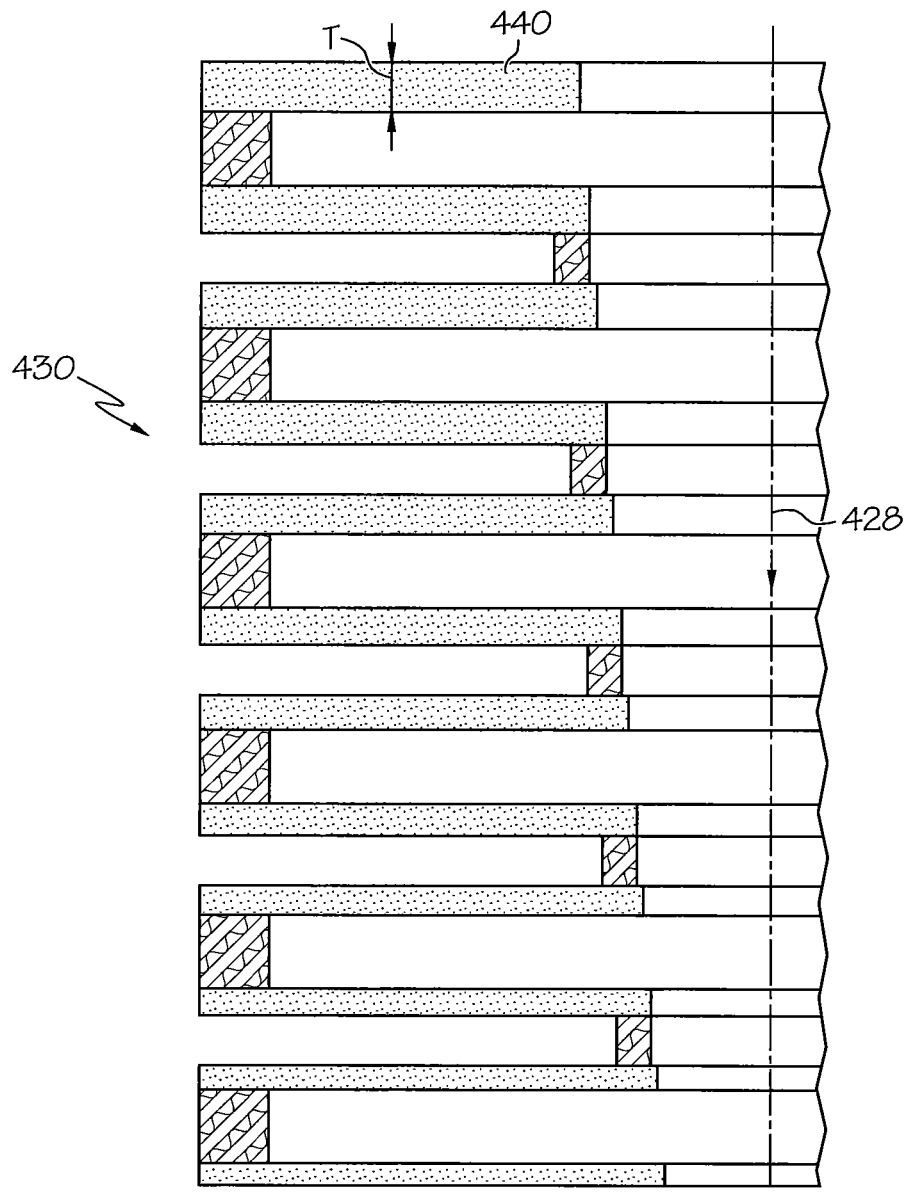
FIG. 5 illustrates a broken away portion of another example filter apparatus.

As shown in FIG. 1, the thickness "T" of each porous ceramic plate 140 of the filter stack 130 is substantially identical such that the thickness does not impact any difference in filter profiles of the ceramic plates. In further examples, at least one of the plates of the filter stack can be provided with a thickness that is different than one or more of the remaining plates. For instance, the plates may have a thickness that is successively less or greater than one another in the axial direction to change the filter profile of each plate and therefore provide desired filtering characteristics throughout the filter. For example, FIG. 5 illustrates a broken away portion of another filter stack 430 wherein the thickness "T" of the plurality of porous ceramic plates 440 is successively smaller than one another in the axial direction 428.

Figure 6:
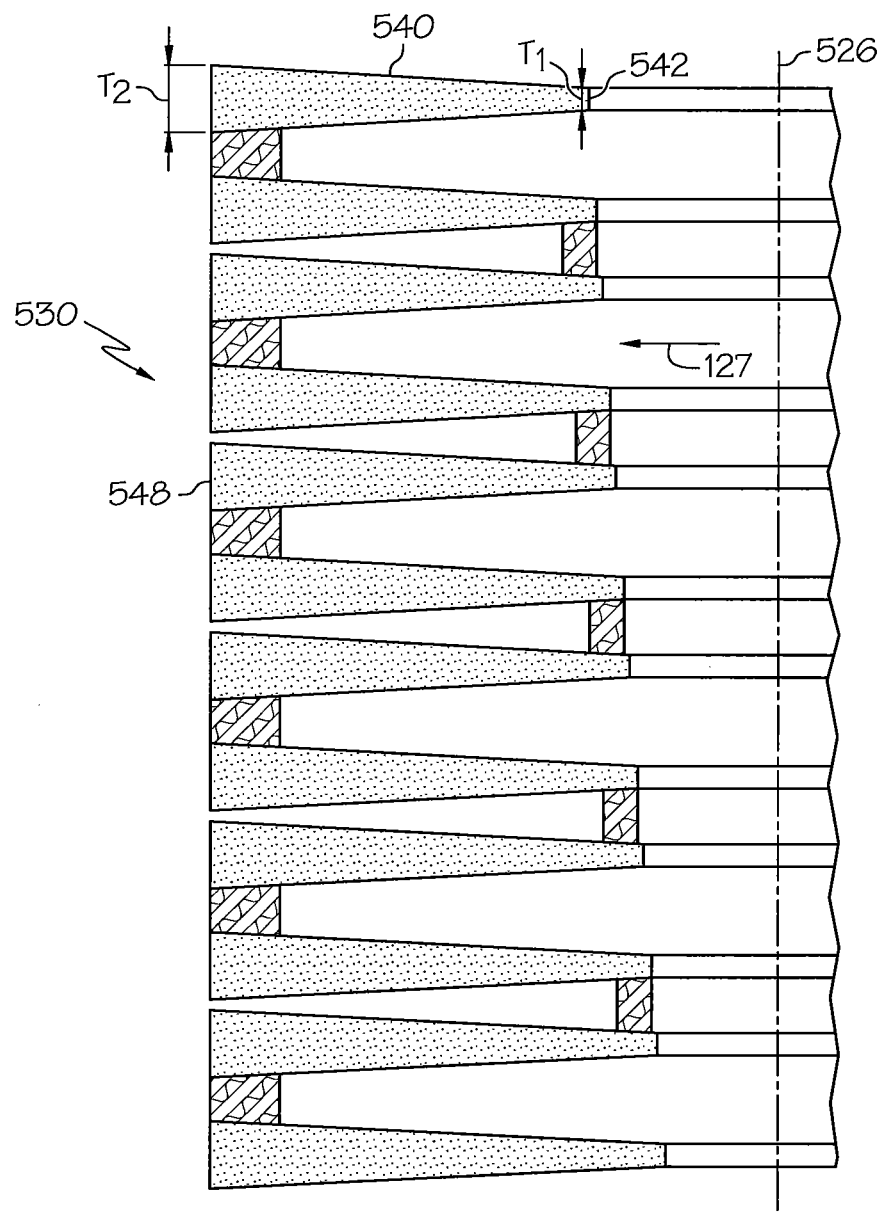
FIG. 6 illustrates a broken away portion of yet another example filter apparatus.

As further illustrated in FIG. 1, the porous ceramic plates also have a thickness "T" that is substantially constant in the radial direction. In further examples, one or more of the disks may have a variable thickness "T" in the radial direction to change the filter profile of the porous ceramic plate in the radial direction. The thickness of the porous ceramic plate may increase or decrease in the radial direction. For example, FIG. 6 illustrates broken away portion of another filter stack 530. As shown the thickness "$T_1$" at the inner periphery of the central aperture 542 is less than the thickness "$T_2$" at the outer peripheral edge 548 of the porous ceramic plate 540. Indeed, the thickness of the porous ceramic plate 540 constantly increases in the radial direction 127 extending away from the axis 526 of the filter stack 530. In alternative examples, the thickness can constantly decrease in the radial direction.

Each porous ceramic plate 140 further includes a central aperture 142 extending through the thickness "T" of the plate. As illustrated, the central apertures 142 of the porous ceramic plates 140 can be positioned along the central flow path 180. As further shown, in more particular examples, the central apertures 142 may be axially aligned with respect to one another along the axis 126 of the filter apparatus 100.

The central apertures 142 can comprise a wide range of shapes and sizes depending on the filter application. Moreover, the porous ceramic plates 140 can have an outer peripheral edge 148 that can also likewise be provided with various shapes and sizes. The shapes of the apertures and/or outer peripheral edges can be circular, elliptical or otherwise curvilinear and/or comprise various polygonal shapes such as triangular, rectangular (e.g., square) or other polygonal shapes. In one example, the central aperture 142 and outer peripheral edge 148 of the corresponding porous ceramic plate 140 are geometrically similar to one another although the shapes may be geometrically different in further examples. For instance, as shown in FIGS. 7 and 8, the illustrated apertures 142 comprise circular apertures that are concentric with geometrically similar circular peripheral edges 148 of the porous ceramic plate 140.

The sizes of the central apertures 142 and outer peripheral edges 148 may also vary with respect to one another depending on the filter application and/or the location of the plate within the housing 110. For example, as shown in FIG. 7, the outer peripheral edges 148 can include a transverse dimension (e.g., diameter "D") transverse to the axis 126 of the filter apparatus 100 in a range from about 3 cm to about 50 cm although other sizes may be provided in further examples. Moreover, the central aperture 142 can include a transverse dimension (e.g., diameter "d") in a range from about 3% to about 80% of the transverse dimension (e.g., diameter "D") of the corresponding outer peripheral edge 148 of the porous ceramic plate 140.

The central apertures of the plates may have the same size although one or more of the apertures may have a different size in further examples. Example filter stacks may further include apertures that successively decrease or increase in size in the axial direction. For example, as shown in FIG. 1, the central apertures 142 of the plurality of porous ceramic plates 140 are successively smaller than one another in the axial direction 128. The successively smaller apertures help define the central flow path 180 that is inwardly tapered in the axial direction 128. As such, the first and second sides of the plurality of porous ceramic plates 140 have corresponding filter surface areas that are successively larger than one another in the axial direction 128. The successively smaller apertures and/or the successively larger surface areas of the porous ceramic plates provide each successive plate with a different filter profile that can help improve the filter efficiency and/or back pressure characteristics of the filter apparatus 100. Although not shown, successively larger filter surface areas can also be provided in alternative ways. For example, the outer peripheral edge 148 may be successively larger in the axial direction. In further examples, of beginning plates may be flat while successively changing surface topography to increase the effective filtering surface area of the plates in the axial direction as described below.

As shown in FIGS. 1, 7 and 8, the porous ceramic plates 140 may comprise a disk that has a relatively thin thickness "T" when compared to a transverse dimension (e.g., diameter "D") of an outer peripheral edge 148. Indeed, as shown in FIG. 1, the disk may a substantially flat plate with a substantially flat filter surface topography on the first side 144 that may be parallel a substantially flat filter surface topography on the second side 146 of the disk. In further examples, at least one of the porous ceramic plates may have one or more filter surfaces that are not substantially flat that increase the surface filtration area of the plate. For instance, at least one of the first side 144 and the second side 146 may have a surface topography including bumps, divots, flutes, ribs and/or the like. Providing surface topographies that are not flat may increase the surface area of the porous ceramic plate to help increase the filtering efficiency. Moreover, a combination plates with different degrees of non-flat surface topographies may help fine tune the filter profile of each individual plate in the axial direction.

Figure 9:
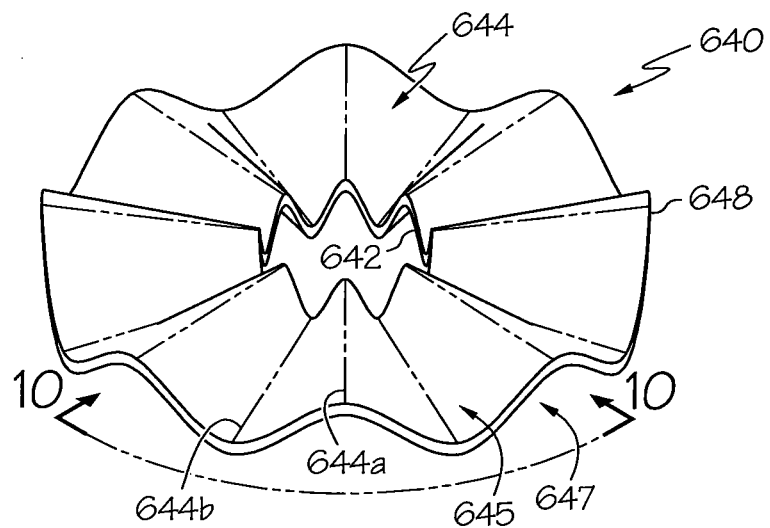
FIG. 9 illustrates a top schematic view of another example porous ceramic plate that can be used with example filter apparatus.
Figure 10:
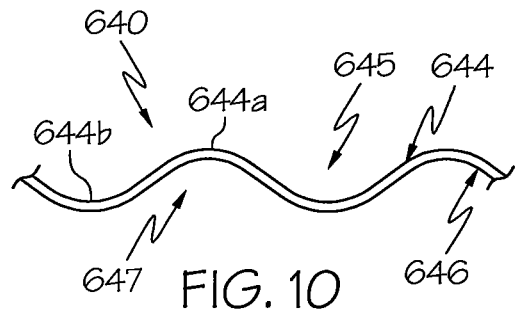
FIG. 10 illustrates an end view along line 10-10 of FIG. 9.

FIGS. 9 and 10 illustrate a first example of a porous ceramic plate 640 that may comprise the same or identical porous ceramic material and otherwise have similar or identical characteristics as the porous ceramic plates described above. However, unlike the example porous ceramic plates described above, the porous ceramic plate 640 of FIGS. 9 and 10 includes a first side 644 and a second side 646 that do not have substantially flat surface topographies. Indeed, the first side 644 includes a plurality of radial flutes 645 arranged in a radial array about a corresponding central aperture 642 of the porous ceramic plate 640. The example radial flutes 645 are defined between corresponding radial peaks 644a and corresponding radial valleys 644b. The radial peaks 644a and radial valleys 644b are respectively represented schematically by solid and dashed radial lines in FIG. 9. Likewise, the second side 646 also includes a plurality of radial flutes 647 arranged in a radial array about the corresponding central aperture 642. As shown by FIGS. 9 and 10, the surfaces defining the radial flutes 645, 647 may be provided by a filter surface that undulates about the corresponding central aperture. As shown in FIGS. 9 and 10 the undulating surface may follow a sinusoidal function about the corresponding central aperture. Indeed, the illustrated surface is shown to be wavy to present a sinusoidal wave that is arrayed about the central aperture 642. In further examples, the wave may comprise a square wave or angular wave or other wave shapes. Furthermore, the flutes may appear as grooves or other radial configurations formed in the surface of the porous ceramic plate.

Figure 11:
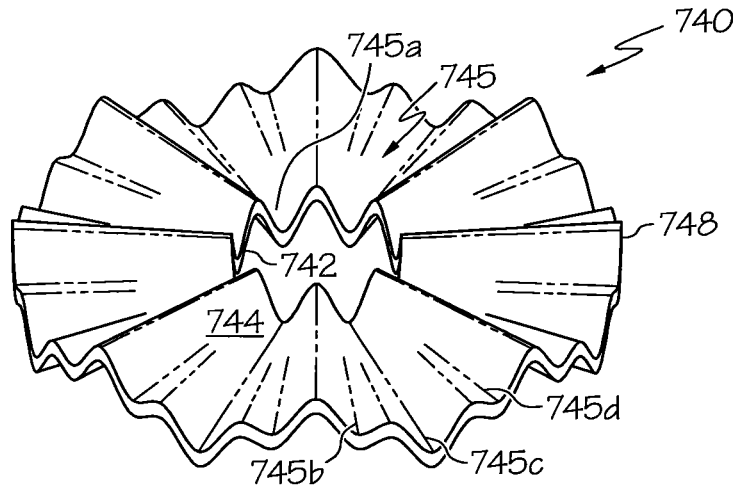
FIG. 11 illustrates a top schematic view of yet another example porous ceramic plate that can be used with example filter apparatus.

If provided, the plurality of radial flutes can have a first number of openings at an outer periphery that is greater than or equal to a second number of openings at the inner periphery defining the central aperture of the porous ceramic plate. For example, as apparent in FIGS. 9 and 10, the radial flutes 645, 647 have a first number of openings the outer peripheral edge 648 that is the same as a second number of openings at an inner periphery defining the central aperture 642. FIG. 11 illustrates another example porous ceramic plate 740 similar to the porous ceramic plate 640 shown in FIGS. 9 and 10, but having a plurality of flutes (corresponding to each side of the plate) that split radially such that the first number of openings at the outer peripheral edge 748 is greater than a second number of openings at the inner periphery defining the central aperture 742. The flutes 745 corresponding to the first side 744 are described with the understanding that such discussion also applies to the flutes corresponding to the second side (not shown) such that the profile view of the edge would be substantially identical to FIG. 10 with three times as many flutes open at the outer peripheral edge 748. As shown in FIG. 11, the flutes 745 are divided three ways such that a plurality of radial inner flutes 745*a* each have a single opening at the inner periphery defining the central aperture 742. Each of the flutes 745 radially splits into a corresponding three radial outer flutes 745*b*, 745*c*, 745*d* although the flutes may divide into two or more than three radial outer flutes in further examples. Providing flutes with increased openings at the outer periphery, as shown in FIG. 11, can further increase the surface area of the porous ceramic disk by inhibiting dilution of the density of flutes in the radial direction that is observed with the wavy disk design illustrated in FIGS. 9 and 10. Moreover, alternative divided arrangements may be provided in further examples. For instance, in alternative examples, all of the peaks at the outer peripheral edge 748 of the first side can reach the same height (like shown in FIG. 10). Likewise, all of the peaks at the outer peripheral edge 748 of the second side can also reach the same depth (like shown in FIG. 10). Indeed, the end view of the divided flutes shown in FIG. 11 can appear substantially identical to FIG. 10 wherein the sinusoidal function has three times the frequency since the flutes are divided three ways.

Turning back to FIG. 1, the porous ceramic plates 140 are axially spaced from one another in the axial direction 128 by a plurality of spacers to define a plurality of axially spaced apart radial flow areas. The plurality of axially spaced apart radial flow areas alternate in the axial direction 128 along the central flow path 180 between a first set of radial flow areas 150 open to the central flow path 180 and closed to the outer peripheral flow path 184, and a second set of radial flow areas 152 closed to the central flow path 180 and open to the outer peripheral flow path 184.

As shown in FIGS. 1 and 8, the plurality of spacers include a first set of spacers 160 that close the outer peripheral flow path 184 from a first set of radial flow areas 150. Moreover, as shown in FIGS. 1 and 9, the plurality of spacers include a second set of spacers 162 that close the central flow path 180 from the second set of radial flow areas 152. In one example, the spacers can comprise compliant spacers although substantially rigid spacers may be used in further example. Compliant spacers, if provided, are capable of being deformed, such as resiliently deformed, under axial compression. In one example, the compliant material comprises a ceramic matting material, such as a ceramic paper although other materials capable of maintaining structural integrity under the operating temperatures of the filter apparatus 100 may be used in further examples. As shown in FIG. 1, providing the spacers as compliant spacers allows the filter stack to be compressed in the axial direction, e.g., by way of fasteners 116, while the compliant spacers axially bias the respective porous ceramic plates from one another to maintain the respective spacing between the porous ceramic plates. In further examples, the spacers may comprise a sealing material, adhesive or other material configured to space the ceramic plates from one another. Moreover, the spacers may be provided separately or may be formed integrally with the plates. In further examples the spacers (e.g., compliant spacers) may be attached to one of the porous ceramic plates before creating the filter stack. For example, the spacers may be attached by printing the spacers on the corresponding porous ceramic plate.

The radial flow areas 150, 152 can each have identical widths defined between a corresponding pair of the porous ceramic plates, although different widths may be used in further examples depending on the filter application. For example, the axial width of at least one of the first set of radial flow areas may be greater than the axial width of at least one of the second set of radial flow areas. As shown in FIG. 1, the axial width of each radial flow area of the first set of radial flow areas 150 is greater than the axial width of each radial flow area of the second set of radial flow areas 152. Providing a greater axial width for the first set of radial flow areas can accommodate particulate build up on the walls as the fluid stream passes through the porous ceramic plates from the first set of radial flow areas 150 to the second set of radial flow areas 152. The axial width of the radial flow areas can be in a range from about 50 microns to about 2000 microns although other widths may be provided in further examples.

Optionally, at least one of the plurality of spaced apart radial flow areas may be divided into a plurality of radial flow channels arranged in a radial array about the central flow path. Dividing the radial flow areas into a plurality of radial flow channels can help radially direct the path of the fluid stream passing between respective porous ceramic plates. In the illustrated example, each of the radial flow areas is divided into a plurality of radial flow channels arranged in a radial array about the central flow path. For example, as shown in FIG. 8, the first set of radial flow areas 150 may be divided into a plurality of radial flow channels 150*a* by radial divider walls 151. Likewise, as shown in FIG. 7, the second set of radial flow areas 152 may be divided into a plurality of radial flow channels 152*a* by radial divider walls 153. The divider walls 151, 153 can comprise various materials. In one example, the divider walls 151, 153 comprise substantially the same material as used to form the compliant spacers 160, 162.

Figure 12:
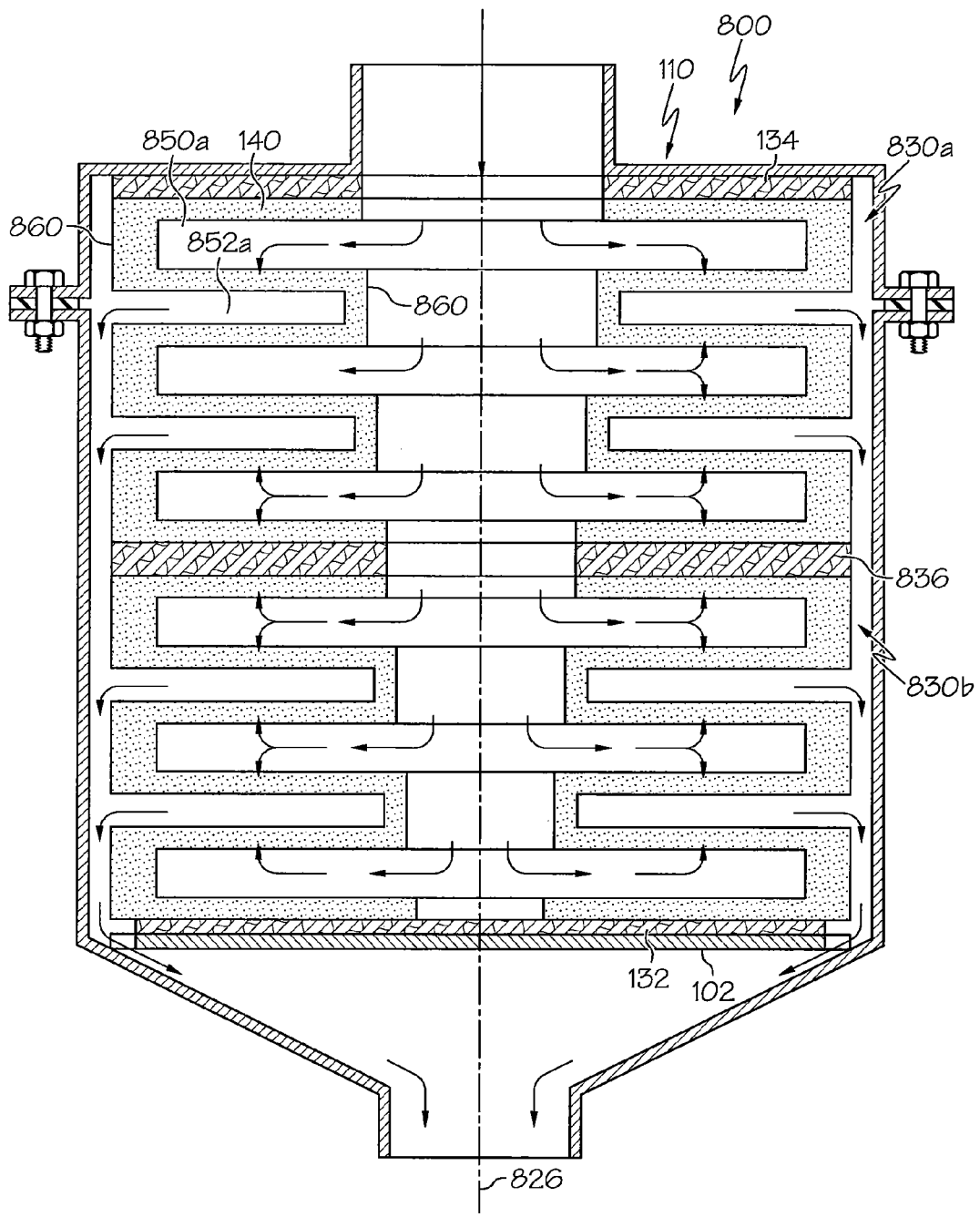
FIG. 12 illustrates a vertical cross-sectional view of another example filter apparatus.

FIG. 12 illustrates a vertical cross-sectional view of another example filter apparatus 800. The filter apparatus 800 can include many of the features described with respect to the filter apparatus 100 described above. Indeed, the filter apparatus may include the same housing 110, support plate 102 and insulation layers 132, 134 although alternative configurations may be provided in further examples. As shown in FIG. 12, the housing may be provided with a first unitary filter stack 830*a* and a second unitary filter stack 830*b* that are axially aligned with one another along the axis 826 of the filter apparatus 800. Although two filter stacks are illustrated in FIG. 12, three or more stacks may be provided in further examples. Each unitary filter stack 830*a* may have a plurality of porous ceramic plates 140 that may be of any configuration discussed above. However, the porous ceramic plates 140 are integrally connected to one another by spacers 860. The spacers 860 may comprise material designed to sinter bond the porous ceramic plates together during a firing of the filter stack as described more fully below.

As shown, a layer of material 836 may be provided between the filter stacks 830a, 830b and may comprise a compliant material similar to the insulation layers 132, 134. The layer of material 836 can help prevent damage or noise that may otherwise be generated if the filter stacks were able to impact one another in response to external forces.

Figure 13:
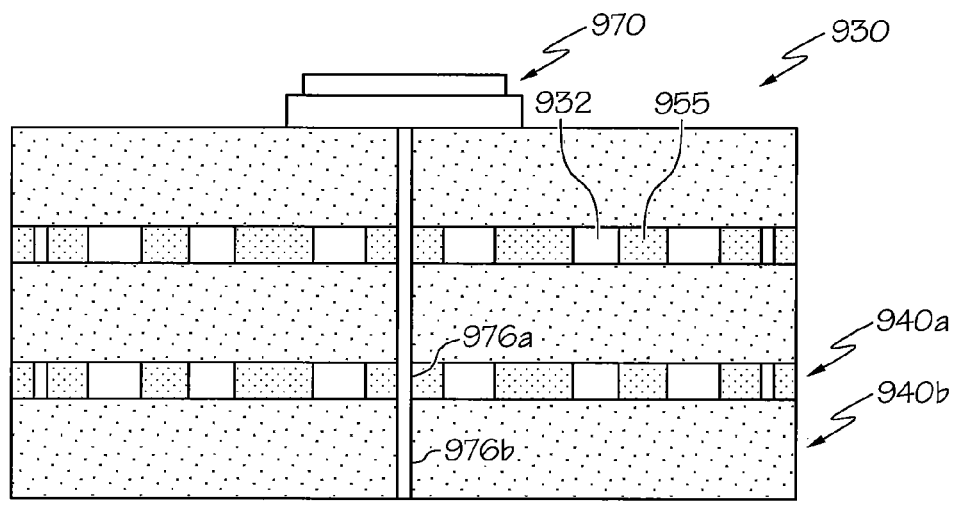
FIG. 13 illustrates an example filter stack including nested porous ceramic plates.

FIG. 13 illustrates another example filter stack 930 that can be used, for example, with various filter apparatus set forth in this disclosure. For example, the filter stack 930 can be used with features described with respect to the filter apparatus 100, 800 described above. For instance, the filter stack 930 can include the same housing 110, support plate 102 and insulation layers 132, 134 although alternative configurations may be provided in further examples. Furthermore, the filter stack 930 may comprise a unitary filter stack used alone or in combination with other filter stacks.

Figure 14:
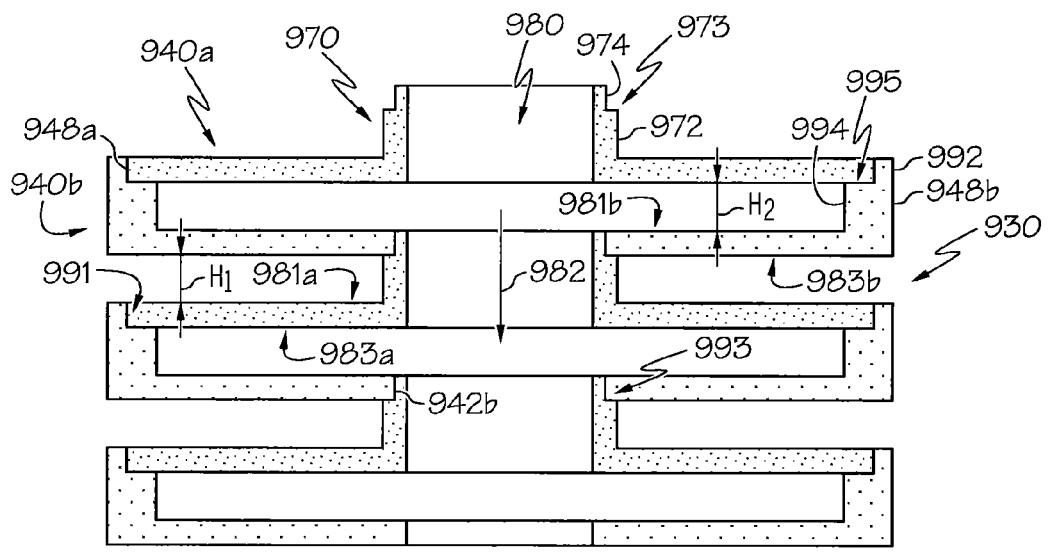
FIG. 14 is a cross sectional view of the filter stack of FIG. 13.

FIG. 14 is a cross-sectional view of the filter stack 930 of FIG. 13. The filter stack 930 defines a central flow path 980 that extends in an axial direction 982 of the filter stack 930. As shown, the plurality of porous ceramic plates alternate in the axial direction 982 of the filter stack 930 between a first set of porous ceramic plates 940a that are nested with a second set of porous ceramic plates 940b. The porous ceramic plates 940a, 940b can include similar or identical features (e.g., filter profile, material type, etc.) as the porous ceramic plates 140 described above.

Figure 15:
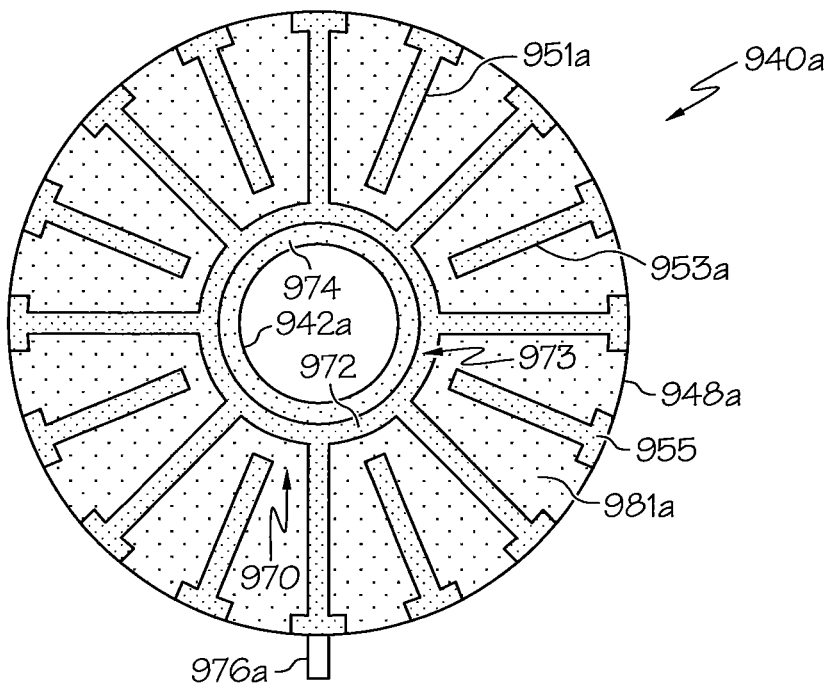
FIG. 15 is a top view of one of a first set of porous ceramic plates of the filter stack of FIG. 13.

FIG. 15 illustrates a top view of one of the first set of porous ceramic plates 940a. As shown in FIG. 15, the top of the plate may have a plurality of ribs (that are not shown in the cross section of FIG. 14 for clarity). The plurality of ribs can include a wide range of configurations. In the illustrated example, the ribs include a first set of ribs 951a radially spaced around the central aperture 942a and a second set of ribs 953a that are also radially spaced around the central aperture 942a with each rib of the second set of ribs 953a be positioned between a corresponding pair of ribs of the first set of ribs 951a. As shown, the ribs of the second set of ribs 953a may be shorter than the ribs of the first set of ribs 951a although identical rib lengths may be provided in further examples. Still further, each rib of the first and second set of ribs 951a, 953a can include an enlarged end 955 designed to provide additional area for sintering as discussed below. As further illustrated, the first set of ribs 951a extend to a central collar member 970. The central collar member 970 can include an outer peripheral portion 972 and an inner peripheral portion 974. As shown in FIG. 14, the outer peripheral portion 972 can include a landing 973 positioned a height "H$_1$" from the top surface 981a. In the illustrated example, the first and second set of ribs 951a, 953a and the enlarged end 955 also have the same height "H$_1$" from the top surface 981a. The outer peripheral edge 948a can also be provided with an alignment tab 976a for alignment with other parts of the filter stack and/or the housing.

Figure 16:
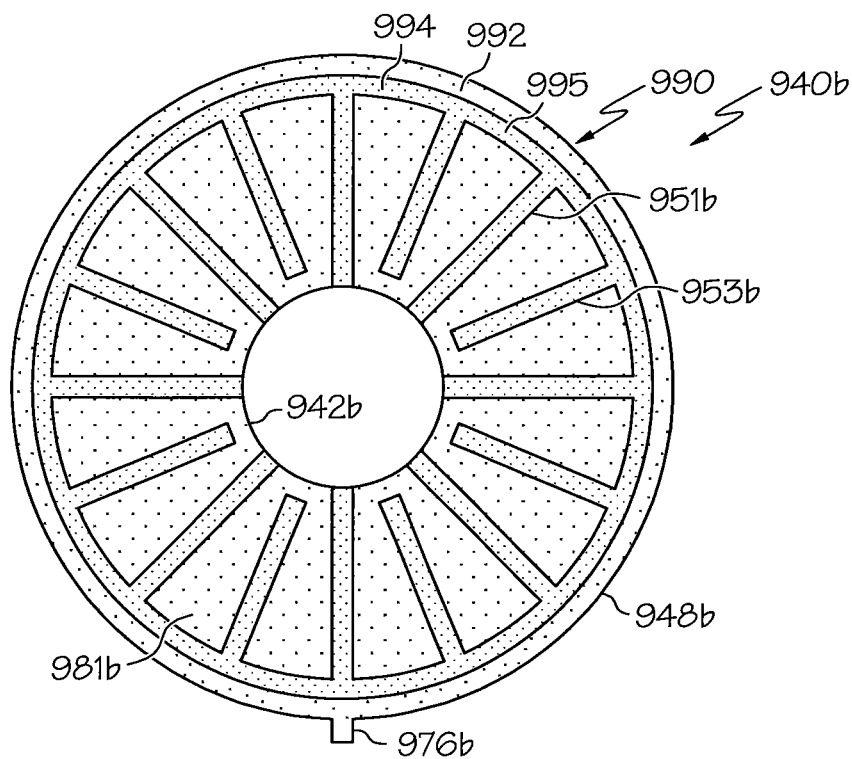
FIG. 16 is a top view of one of a second set of porous ceramic plates of the filter stack of FIG. 13.

FIG. 16 illustrates a top view of one of the second set of porous ceramic plates 940b. As shown in FIG. 16, the top of the plate may have a plurality of ribs (that are not shown in the cross section of FIG. 14 for clarity). The plurality of ribs can include a wide range of configurations. In the illustrated example, the ribs include a first set of ribs 951b radially spaced around the central aperture 942b and a second set of ribs 953b that are also radially spaced around the central aperture 942b with each rib of the second set of ribs 953b be positioned between a corresponding pair of ribs of the first set of ribs 951b. As shown, the ribs of the second set of ribs 953b may be shorter than the ribs of the first set of ribs 951b although identical rib lengths may be provided in further examples. As further illustrated, the first and second set of ribs 951b, 953b extend to an outer peripheral spacing element 990. The outer peripheral spacing element 990 can include an outer peripheral portion 992 and an inner peripheral portion 994. As shown in FIG. 14, the inner peripheral portion 994 can include a landing 995 positioned a height "H$_2$" from the top surface 981b. In the illustrated example, the first and second set of ribs 951b, 953b also have the same height "H$_2$" from the top surface 981a. The outer peripheral edge 948b can also be provided with an alignment tab 976b for alignment with other parts of the filter stack and/or the housing.

As shown in FIG. 14, each porous ceramic plate of the first set of porous ceramic plates 940a includes an outer peripheral edge 948a configured to nest within a corresponding porous ceramic plate of the second set of porous ceramic plates 940b. For example, as shown, a bottom surface 983a of the first set of porous ceramic plates 940a are configured to rest against the landing 995 and the top surface of the ribs 951b, 953b. Moreover, the outer peripheral edge 948a is nested within a groove 991 formed between the landing 995 and the outer peripheral portion 992.

Moreover, the central collar portion 970 of each of the first set of porous ceramic plates 940a may be configured to nest with the central aperture 942b of a corresponding plate of the second set of porous ceramic plates 940b. For example, as shown, the second set of porous ceramic plates 940b each include a bottom surface 983b configured to rest against the landing 973 and the top surface of the ribs 951a, 953a. Moreover, an inner surface defining the central aperture 942b is configured to nest within a groove 993 formed between the landing 973 and the inner peripheral portion 974. The central collar portion 970 may be configured to be received within the central aperture 942b of a corresponding porous ceramic plate of the second set of porous ceramic plates 940b. For example, as shown, the inner peripheral portion 974 of the central collar member 970 may be received within the central aperture 942b while the bottom surface 983b of the second set of porous ceramic plates 940b rest against the landing 973 and the top surface of the ribs 951a, 953a.

As shown in FIG. 13, the plates may be stacked such that the corresponding alignment tabs 976a, 976b are aligned along the axial direction 982. Once stacked, the vent openings 932 are defined between corresponding enlarged ends 955 of the first and second set of ribs 951a, 953a.

As shown, the top surfaces 981a, 981b and the bottom surfaces 983a, 983b of each of the plates is substantially flat although other surfaces may be provided in further examples as described with respect to other example porous ceramic plates of the disclosure.

The first and second sets of porous ceramic plates 940a, 940b may be fabricated by various techniques such as stamping, molding, 3D printing techniques typically used for rapid prototyping, or the like. Moreover, the plates may be fired before or after building the filter stack 930. For example, a ceramic-forming material may be produced into the general configuration of the plates 940a, 940b. The plates may then be dried and fired to produce the first and second sets of porous ceramic plates 940a, 940b. The porous ceramic plates 940a, 940b may then be stacked as shown in FIG. 14 with a sintering material applied between the plates. For example, a slurry of sinter forming material may be painted, sprayed or otherwise applied to the intersecting surfaces of the plates. In further examples, portions of the plates may be dipped into a slurry bath of sinter forming material. For instance, the first plurality of porous ceramic plates 940a may be inverted and dipped into a slurry bath to coat the inner peripheral portion 974, the landing 973, the top surfaces of the ribs 951a, 953a (including enlarged ends 955). Likewise, the second plurality of porous ceramic plates 940b may be inverted and dipped into a slurry bath to coat the outer peripheral portion 992, the landing 995 and the top surfaces of the ribs 951b, 953b with sinter forming material. Once stacked, as shown in FIG. 14, the filter stack 930 may then be fired again wherein the coating of material sinters together the porous ceramic plates 940a, 940b. In alternative embodiments, the filter stack may be designed to operate without a second firing step. For example, the plates may be attached to one another with an adhesive material. In further examples, a compliant material may be provided between the plates and the filter stack may then be compressed within a housing using techniques similar to those disclosed with respect to the filter stack 130 illustrated in FIG. 1.

Figure 17:
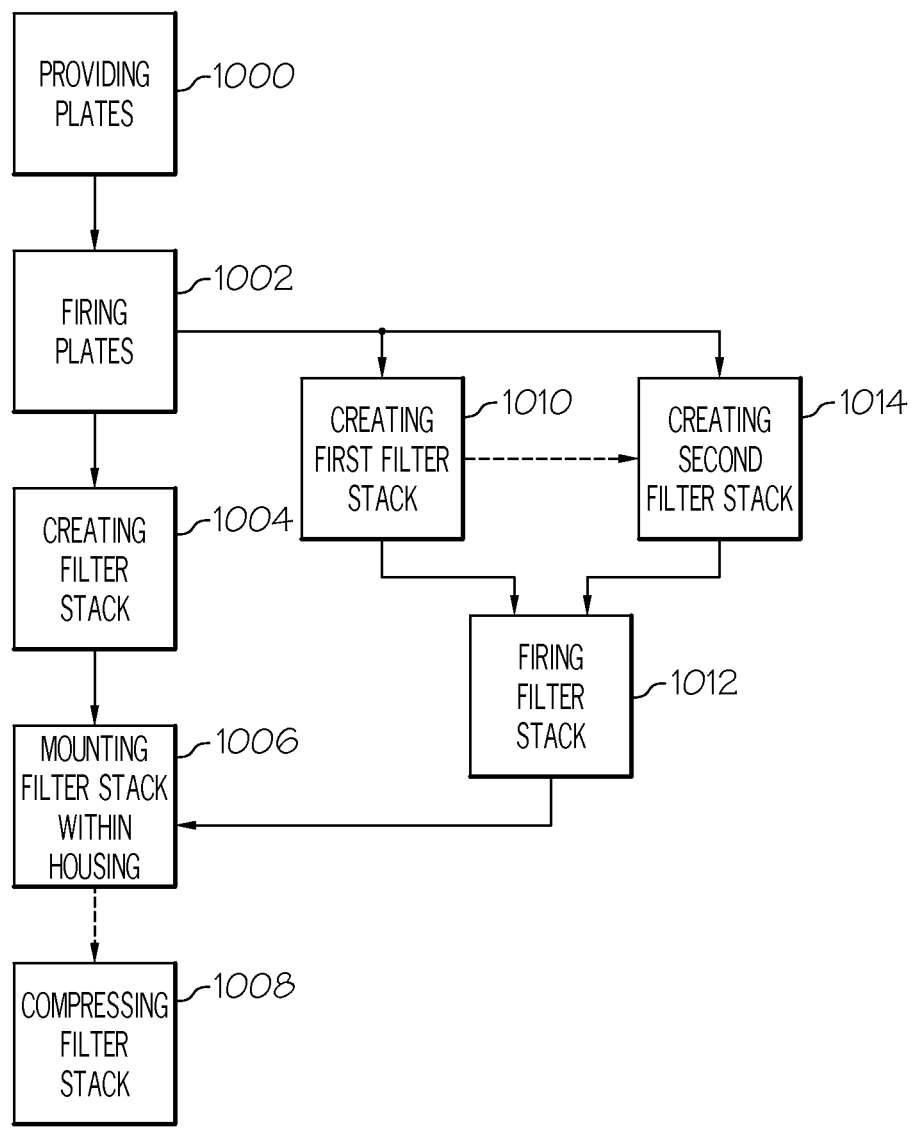
FIG. 17 is a flow chart illustrating example steps of making a filter apparatus.

FIG. 17 is a flow chart illustrating example steps of making a filter apparatus. In order to make the filter apparatus 100 illustrated in FIG. 1, the method may include the step 1000 of providing a plurality of plates with a central aperture, wherein each plate is formed from a ceramic-forming material.

After the step 1000 of providing the plates, the method then includes the step 1002 of firing the plurality of plates to form the plurality of porous ceramic plates 140 that each includes the central aperture 142. The same or similar firing procedure may be performed to form any porous ceramic plate in accordance with the present disclosure including but not limited to the porous ceramic plates 240, 340, 440, 540, 640, 740 also described above.

The method can then include the step 1004 of creating the filter stack 130 by axially spacing the porous ceramic plates 140 from one another in the axial direction 128 with the plurality of compliant spacers 160, 162 to define a plurality of axially spaced apart radial flow areas 150, 152. The central apertures 142 of the plurality of porous ceramic plates 140 are positioned along the central flow path 180. Moreover, the radial flow areas alternate in the axial direction 128 between the first set of radial flow areas 150 that are open to the central flow path 180, and the second set of radial flow areas 152 that are closed to the central flow path 180.

The method can then include the step 1006 of mounting the filter stack 130 within the housing 110 such that the first fluid port 118 is in fluid communication with the central flow path 180 and the second fluid port 120 is in communication with the outer peripheral flow path 184 defined between the filter stack 130 and the housing 110. Once mounted, the first set of radial flow areas 150 are closed to the outer peripheral flow path 184 and the second set of radial flow areas 152 are open to the outer peripheral flow path 184.

Optionally, method can further include the step 1008 of compressing the filter stack 130. For example, the second housing portion 114 and the first housing portion 112 can be clamped together with the fasteners 116 to compress the filter stack 130 in the axial direction 128 while the compliant spacers 160, 162 axially bias the respective porous ceramic plates 140 from one another to maintain the respective spacing between the porous plates. In the illustrated example, the housing is used to compress the filter stack but a compressing arrangement separate from the housing may be used in further examples.

The flow chart of FIG. 17 also illustrates steps of making the filter apparatus 800 illustrated in FIG. 12. In order to make the filter apparatus 800 illustrated in FIG. 12, the method may include the step 1000 of providing a plurality of plates with a central aperture, wherein each plate is formed from a ceramic-forming material. After the step 1000 of providing the plates, the method then includes the step 1002 of firing the plurality of plates to form the plurality of porous ceramic plates 140 that each includes the central aperture 142. The same or similar firing procedure may be performed to form any porous ceramic plate in accordance with the present disclosure including but not limited to the porous ceramic plates 240, 340, 440, 540, 640, 740 also described above.

Figure 18:
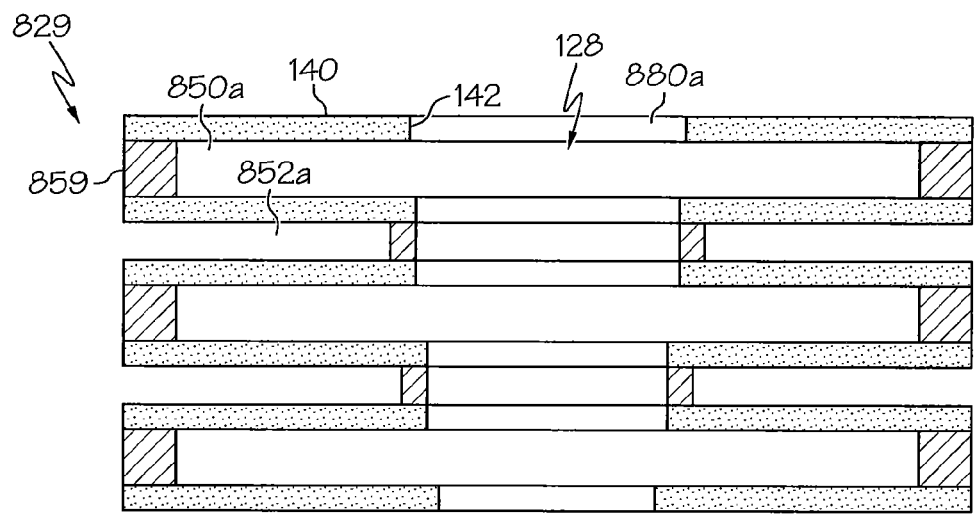
FIG. 18 illustrates a filter stack with a plurality of porous ceramic plates spaced from one another in an axial direction of the filter stack with a spacing element.

Next, the method includes can further include the step 1010 of creating a first filter stack 829 depicted in FIG. 18. The first filter stack 829 is formed by axially spacing the first plurality of porous ceramic plates 140 from one another in the axial direction 128 of the filter apparatus with a first spacing element 859 to define a first plurality of axially spaced apart radial flow areas. The first spacing element 859 may comprise a layer of material configured to sinter bond the porous ceramic plates together during a subsequent firing procedure. Example materials for the first spacing element 859 may comprise glass frit sealing, inorganic binder cement such as aluminum phosphate or other materials. The central apertures 142 of the first plurality of porous ceramic plates 140 are positioned along a first central flow path 880a, and the radial flow areas alternate in the axial direction of the first filter stack between a first set of radial flow areas 850a that are open to the first central flow path 880a, and a second set of radial flow areas 852a that are closed to the first central flow path 880a.

Figure 19:
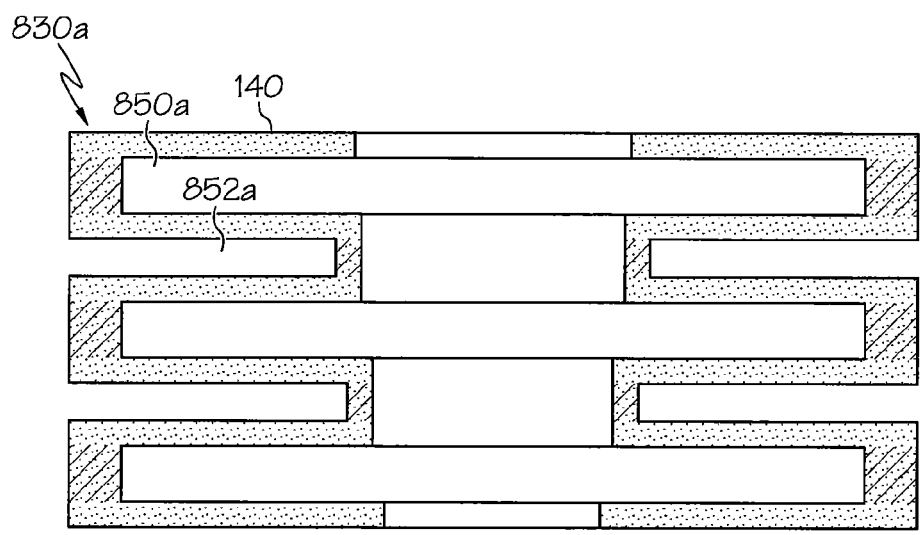
FIG. 19 illustrates the filter stack of FIG. 18 after firing such that the plurality of porous ceramic plates are sinter bonded together with the spacing element.

Once the first filter stack 829 is formed, the first filter stack may then be subsequently fired during method step 1012 to sinter bond the first plurality of porous ceramic plates 140 together with the first spacing element 859. After firing step 1012, the first unitary filter stack 830a is formed as shown in FIG. 19, wherein the first spacing element 859 is integrally bonded between the porous ceramic plates 140 to form the first and second set of radial flow areas 850a, 850b. Although not shown in FIG. 18, spacer ribs may be provided to help maintain the space between the plates while the first spacing element 859 sinter bonds the plates together. For instance, in one example, the porous ceramic plates 140 may be formed of a material including mullite while the spacing elements 859 may be formed of cordierite. The cordierite material has a lower melting point than the mullite porous ceramic plates 140. As such, the plates may be bonded together at a lower firing temperature (e.g. less than 100° C.) wherein the ceramic material 859 may begin melting and infiltrating into the pores of the porous mullite ceramic plates. While the ceramic material spacing elements 859 become compliant during the melting process, the spacers (not show) maintain the spacing between the plates. After the firing process, the filter stack forms a unitary structure wherein the cordierite spacing elements are integrated with the porous mullite material to form a desirable seal. The spacers (not shown) used in combination with the spacing elements 859 can, for example, comprise radial ribs similar in shape as the ribs 951a, 951b, 953a, 953b described with respect to FIGS. 15 and 16 above. The spacers may be integral ribs or spacers attached (e.g., by printing) or otherwise placed between the plates.

At the same time or after forming the first unitary filter stack 830a, the second unitary filter stack 830b may be formed by a similar procedure. Indeed, the same steps 1000 and 1002 can be carried out to provide a second plurality of porous ceramic plates that may be identical to the first plurality of porous ceramic plate. Moreover, the method can include the step 1014 of creating the second filter stack that may be identical to the first filter stack 829 illustrated in FIG. 18. Indeed, the second filter stack, similar to the first filter stack 829, may be created by axially spacing the second plurality of porous ceramic plates (e.g., identical to the first plurality of porous ceramic plates) from one another in the axial direction of the second filter stack with a second spacing element (e.g., identical to the first spacing element) to define a second plurality of axially spaced apart radial flow areas. The central apertures of the second plurality of porous ceramic plates are positioned along a second central flow path, and the second plurality of radial flow areas alternate in an axial direction of the second filter stack between another first set of radial flow areas that are open to the second central flow path, and another second set of radial flow areas that are closed to the second central flow path. Once the second filter stack is formed, the method can further include a similar firing step 1012 to sinter bond the second plurality of porous ceramic plates together with the second spacing element to provide the second unitary filter stack 830b. In certain firing method steps 1012, the first and second unitary filter stack 830a, 830b may be formed during the same firing procedure or may be formed during separate firing procedures.

Once fired, the first unitary filter stack 830a and/or the second unitary filter stack 830b may be mounted within the housing 110 during method step 1006. Once mounted, the first fluid port 118 will be in fluid communication with the first central flow path 880a and a second fluid port 120 will be in communication with the outer peripheral flow path 184 defined between the first filter stack 830a and the housing 110. If provided with a second unitary filter stack 830b, the first and second filter stacks 830a, 830b can be mounted in series within the housing 110 as shown in FIG. 12. Once mounted, the first and second central flow paths of the first and second filter stacks 830a, 830b are in fluid communication with one another. Moreover, the first fluid port 118 will be placed in fluid communication with the central flow paths of the first and second filter stacks 830a, 830b and a second fluid port 120 will be placed in fluid communication with the outer peripheral flow path defined between the filter stacks and the housing. Once mounted, the first sets of radial flow areas will be open to the central flow paths and closed to the outer peripheral flow path, and the second sets of radial flow areas will be closed to the central flow paths and open to the outer peripheral flow path.

After the method step 1006 of mounting, the first and second filter stacks 830a, 830b may be optionally compressed within the housing during method step 1008.

A method of operating the filter apparatus will now be described with respect to the filter apparatus 100 described in FIG. 1 with the understanding that the same operation may also apply to the filter apparatus 800 illustrated in FIG. 12. In operation, a fluid stream 122 enters the first fluid port 118 of the housing 110. The fluid stream then travels down the central flow path 180 in the axial direction 128 toward the second fluid port 120. The first set of radial flow areas 150 are open to the central flow path 180. As such, the fluid stream 122 eventually passes from the central flow path 180 to radially travel outward and into one of the radial flow areas of the first set of radial flow areas 150. The fluid stream 122 then passes through one of the porous ceramic plates 140 to enter one of the radial flow areas of the second set of radial flow areas 152. The porous ceramic plates filter particular matter from the fluid stream as the fluid stream passes from the first set of radial flow areas 150 to the second set of radial flow areas 152. Moreover, if catalytic material is provided, gases may also be removed from the fluid stream. The second set of radial flow areas 152 are open to the outer peripheral flow path 184. As such, the filtered fluid stream eventually travels through the second set of radial flow areas 152 to the outer peripheral flow path 184. The filtered fluid stream then travels along the outer peripheral flow path 184 and out the second fluid port 120.

In further examples, a method of creating a filter stack similar to the filter stack shown in FIG. 19 can first include the step of forming a plurality of plates from with a composition comprising catalyst particles and a binder material. The catalyst materials can comprise catalyst suitable for NOx removal such as zeolite or aluminosilicate material, ceria-zirconia, alumina, perovskites, spinel, titania, ceria and zirconit. In addition, these materials may be impregnated with at least one precious metal from the group Pt, Pd, & Rh to further lower the soot regeneration temperature. On one example, the metal catalyzed zeolites may be used, e.g., M-Beta, M-Chabazite, M-ZSM5, M-Mordenite, M-MCM-4, M-Ferrerite, M-NaY & M-USY. M may represent Fe, Cu, Ce, Co, Pt, Rh & Pd. In one example, the exchange of the metal can be between 0.5% and 6%. The zeolite silicate/alumina range can be greater than 10 and the disks can constitute combinations of these M-zeolite materials with different porosity and MPS range. Porosity may range from 30%-80% and MPS 1-50 microns. Alternatively, suitable precursor composition which may undergo a hydrothermal treatment to form such metal exchange zeolites as listed above may be used.

The plurality of plates can be fired without sintering a substantial amount of the catalyst particles. The filter stack can be created. In one example, the entire filter stack is fired together such that the filter stack forms a unitary structure. In other examples, the filter stack includes compliant spacers as described above.

The plates can be made by 3D printing or suitable molding process. Prior to making the plates, the catalyst or catalyst supported materials may be sized appropriately to provide a good and broad distribution with small fine tail end. spraydrying or appropriate methods can also be used to agglomerate the particles. Additional poreforming materials may be included. The material can be printed using 3D rapid protyping and the plates can be infused with a colloidal silica binder or a silicone resin to strengthen the body after firing. Such low temperature binders allow for consolidation of the plates will below 1000° C. The resulting plates can be assembled as described in the disclosure or by appropriate inorganic binder such as aluminophosphate.

Figure 20:
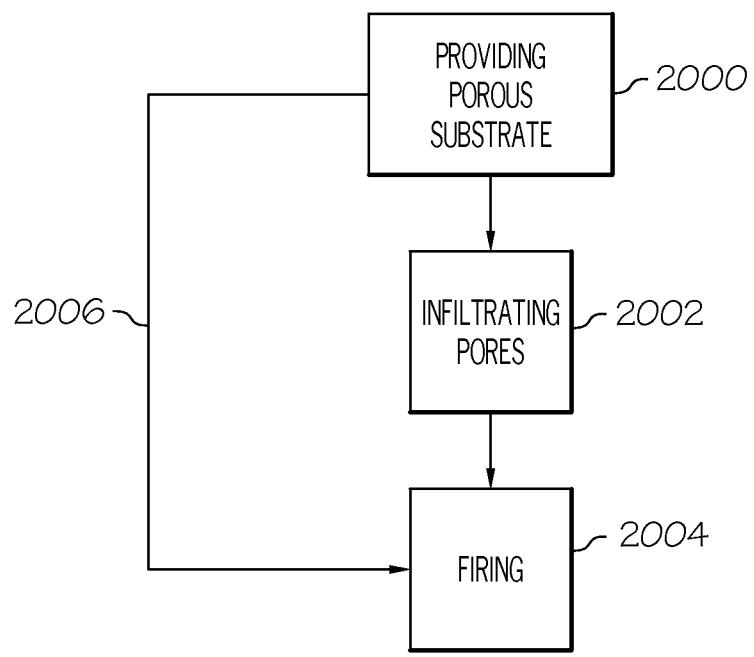
FIG. 20 illustrates a method of fabricating a porous ceramic article.

FIG. 20 illustrates a method of fabricating a porous ceramic article. Porous articles may comprise any of the porous plates discussed above, honeycomb filters or other porous ceramic articles. The method begins with the step 2000 of providing a porous substrate comprising a first material composition including mullite. The mullite substrate may be formed by a 3D printing procedure, molded or other techniques. The pores may then be infiltrated with a second material including cordierite during step 2002. In one example, the second material is printed, sprayed or otherwise applied to the substrate. After infiltrating, the porous ceramic article can then be formed during firing step 2004. In one example, the second material composition has a lower melting point than the first material composition. As such, the general shape of the porous substrate may remain consistent while the lower melting point material integrates with the porous substrate.

As further shown in FIG. 20, as represented by arrow 2006, the substrate may be infiltrated with the second material during the step of firing. For example, cordierite material may be brought into contact with the mullite substrate during the firing step wherein the melted cordierite wicks into the porous mullite, thereby infiltrating the substrate.

With respect to FIG. 20 above, high-porosity (e.g., 60% or more) ceramic articles maybe produced by 3D printing, or other forming processes and then may be infiltrated or partially infiltrated to form a customized high strength ceramic or glass-ceramic composite. In one example, the articles are contacted with a second ceramic or glass material with a lower melting temperature during firing. In another example, the substrate is infiltrated with a slurry of a second C/GC material and then fired. In still another example, batch and printing a mixture of two ceramic materials with differing melting temperatures may be employed. The lower melting temperature material melts and is wicked into the pores of the more refractory C/GC material. Distortion of the original part shape can be minimal. Additionally, providing the porous substrate of mullite and the second material of cordierite provides that the cordierite has a lower melting temperature and is an effective bonding agent that ca be used to permanently "glue" the two mullite articles together in accordance with aspects of the disclosure discussed above. The ability to permanently bond multiple articles (e.g., from mullite) provides the ability to fabricate a single, large structure (e.g., filter stack) from multiple small structures (e.g., porous mullite plates), thereby significantly increasing the size limit of the forming process.

Articles produced with the method illustrated in FIG. 20 and discussed above can provide many advantages. For example, after the article is fired with the second ceramic or glass material, the article may exhibit increased strength with minimal distortion of the article. In addition, infiltrating the pores during the process can control the porosity and weight gain of the composite article.

In example embodiments, the filter stacks may be formed by first creating porous ceramic plates as described herein. The relatively simple plate design allows the plates to be formed first and can permit layering of material that may be difficult with other ceramic filter designs. For example, the plate can be relatively easily constructed such that the composition, porosity, or pore structures varies from one side to the other, either by layering during forming or by applying coatings to the formed, green disk, or after firing prior to assembly/sealing.

As described above, the relatively simple plate design also allows axial and/or radial variation of the plate. For example, the plate can have axial and/or radial variation of thickness, porosity, composition or design (e.g., inner and outer diameter) to control heat, gas flow or catalytic function along the axial and/or radial directions. One or both sides of the plates can also be easily treated with a catalyst or other material to form coating layers, or multiple layer structures with unique filtering capabilities.

As the plates can be identical to one another, the plates may be formed first during a firing process. The plates can then be stacked and spaced from one another with compliant spacers within the filter. As such, a subsequent firing procedure can be avoided in some examples.

In further examples, a unitary filter stack may be formed by sintering the previously formed porous ceramic plates together. Providing two sintering procedures can provide a more controlled firing process that may otherwise be complicated by pore formers burning out during the firing process. Moreover, the porous ceramic plates may be made from a different material than the spacing elements used to sinter the plates together. The spacing elements, for example, may have a lower temperature necessary to sinter the plates. The lower temperatures can allow sufficient sintering of the plates together without thermal damage (e.g., deformation) to the plates that may otherwise occur at higher temperatures. In one example, the plates are made from a mullite composition while the spacing elements are made from a cordierite material. During the second firing step, the cordierite material may sinter the mullite plates together at a temperature that is not high enough to damage the mullite plates.

Filter apparatus with unitary filter stacks may be segmented, as shown in FIG. 12, into two or more segments that are axially aligned with one another. Segmenting the filter can be desirable to reduce stress due to thermal gradients that might otherwise develop with a single unitary filter stack spanning the length of the filter apparatus.

In further examples, the filter stacks may be printed using a 3D printing process, dried and then fired to form the unitary structure. Such a printing process may alternately form the plates with one material and then the spacing elements from the same or another material. The printing process can then continue until the entire filter stack is formed. Once dried, the filter stack can then be fired to form the unitary filter stack.

In use, the filter stacks of porous ceramic plates can provide beneficial filter characteristics such as reduced back pressure. Such filter designs may be used in processing various fluid streams that are gaseous, liquid or gaseous plus liquid. These fluid streams may or may not include particulate to be filtered. Indeed, the filter designs may be configured to purely address absorption or conversion of certain gaseous or liquid components of a fluid stream, purely to filter particulate from the stream or may be provided for a combination of particulate and absorption of certain gases. Moreover, reduced thermal gradients may be experienced during regeneration processes, thereby avoiding thermal shock that may otherwise crack other ceramic filter designs. Moreover, the radial design of the filter may provide favorable burn-out of soot in the circumference regions of the filter because the radial flow through the filter will send more heat to those regions.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

What is claimed is:

1. A filter apparatus comprising:
a housing including a first fluid port and a second fluid port;
a filter stack mounted within the housing and configured to filter a fluid stream between the fluid ports with the filter stack defining a central flow path in fluid communication with the first fluid port, wherein the filter apparatus includes an outer peripheral flow path in fluid communication with the second fluid port and defined between the filter stack and the housing;
the filter stack including a plurality of porous ceramic plates axially spaced from one another in an axial direction of the filter apparatus by a plurality of spacers to define a plurality of axially spaced apart radial flow areas, each porous ceramic plate including a thickness extending between a first side and a second side of the porous ceramic plate, and each porous ceramic plate further including a central aperture extending through the thickness of the plate, the central apertures of the porous ceramic plates positioned along the central flow path, wherein the thickness of the plate is further provided along a radial direction of the plate from the central aperture to an outer peripheral edge of the plate;
wherein the plurality of axially spaced apart radial flow areas alternate in the axial direction along the central flow path between a first set of radial flow areas open to the central flow path and closed to the outer peripheral flow path, and a second set of radial flow areas closed to the central flow path and open to the outer peripheral flow path; and
wherein the plurality of porous ceramic plates each include a filter profile defined between the first side and the second side of the porous ceramic plate that is selected from the group consisting of i) ceramic material composition, ii) porosity, iii) median pore diameter, iv) plate layering, v) catalyst loading, vi) the plate thickness being provided as a substantially constant plate thickness along the radial direction of the plate, vii) size of the central aperture, and viii) plate surface topography; and wherein at least two of the plurality of porous ceramic plates have substantially different filter profiles.

2. The filter apparatus of claim 1, wherein the filter profile is selected from the group consisting of i) ceramic material composition, ii) porosity, iii) median pore diameter, iv) plate layering, and v) catalyst loading, and wherein the filter profile of at least one of the plurality of porous ceramic plates substantially changes in the radial direction of the porous ceramic plate.

3. The filter apparatus of claim 1, wherein at least one of the first side and the second side of at least one of the plurality of porous ceramic plates define a plurality of radial flutes arranged in a radial array about the corresponding aperture of the porous ceramic plate.

4. The filter apparatus of claim 3, wherein each of the plurality of porous ceramic plates includes an inner periphery defining the corresponding central aperture, and the plurality of radial flutes have a first number of openings at an outer periphery that is greater than a second number of openings at the inner periphery of the at least one of the plurality of porous ceramic plates.

5. The filter apparatus of claim 1, wherein the apertures of the plurality of porous ceramic plates are successively smaller than one another in the axial direction.

6. A filter apparatus comprising:
a housing including a first fluid port and a second fluid port,
a filter stack mounted within the housing and configured to filter a fluid stream between the fluid ports with the filter stack defining a central flow path in fluid communication with the first fluid port, wherein the filter apparatus includes an outer peripheral flow path in fluid communication with the second fluid port and defined between the filter stack and the housing,
the filter stack including a plurality of porous ceramic plates axially spaced from one another in an axial direction of the filter apparatus by a plurality of spacers to define a plurality of axially spaced apart radial flow areas, each porous ceramic plate including a thickness extending between a first side and a second side of the porous ceramic plate, and each porous ceramic plate further including a central aperture extending through the thickness of the plate, the central apertures of the porous ceramic plates positioned along the central flow path,
wherein the plurality of axially spaced apart radial flow areas alternate in the axial direction along the central flow path between a first set of radial flow areas open to the central flow path and closed to the outer peripheral flow path, and a second set of radial flow areas closed to the central flow path and open to the outer peripheral flow path, and
wherein at least one of the plurality of porous ceramic plates includes a first layer defining the first side of the porous ceramic plate and a second layer defining the second side of the porous ceramic plate, wherein the first layer and second layer have a substantially different filter profile defined between the first side and the second side of the porous ceramic plate.

7. The filter apparatus of claim 6, wherein the plurality of porous ceramic plates each include a filter profile defined by the first layer and the second layer of the porous ceramic plate, and wherein at least two of the plurality of porous ceramic plates have substantially different filter profiles.

8. The filter apparatus of claim 6, wherein at least one of the plurality of porous ceramic plates has a filter profile defined by the first layer and the second layer, wherein the filter profile substantially changes in a radial direction of the porous ceramic plate.

9. The filter apparatus of claim 6, wherein at least one of the first side and the second side of at least one of the plurality of porous ceramic plates define a plurality of radial flutes arranged in a radial array about the corresponding aperture of the porous ceramic plate.

10. The filter apparatus of claim 9, wherein each of the plurality of porous ceramic plates includes an inner periphery defining the corresponding central aperture, and the plurality of radial flutes have a first number of openings at an outer periphery that is greater than a second number of openings at the inner periphery of the at least one of the plurality of porous ceramic plates.

11. The filter apparatus of claim 6, wherein the apertures of the plurality of porous ceramic plates are successively smaller than one another in the axial direction.

12. A filter apparatus comprising:
a housing including a first fluid port and a second fluid port,
a filter stack mounted within the housing and configured to filter a fluid stream between the fluid ports with the filter stack defining a central flow path in fluid communication with the first fluid port, wherein the filter apparatus includes an outer peripheral flow path in fluid communication with the second fluid port and defined between the filter stack and the housing,
the filter stack including a plurality of porous ceramic plates axially spaced from one another in an axial direction of the filter apparatus by a plurality of spacers to define a plurality of axially spaced apart radial flow areas, each porous ceramic plate including a thickness extending between a first side and a second side of the porous ceramic plate, and each porous ceramic plate further including a central aperture extending through the thickness of the plate, the central apertures of the porous ceramic plates positioned along the central flow path,
wherein the plurality of axially spaced apart radial flow areas alternate in the axial direction along the central flow path between a first set of radial flow areas open to the central flow path and closed to the outer peripheral flow path, and a second set of radial flow areas closed to the central flow path and open to the outer peripheral flow path, and
wherein at least one of the first side and the second side of at least one of the plurality of porous ceramic plates define a plurality of radial flutes arranged in a radial array about the corresponding aperture of the porous ceramic plate.

13. The filter apparatus of claim 12, wherein the plurality of spacers comprise compliant spacers and the filter stack is compressed in the axial direction while the compliant spacers axially bias the respective porous ceramic plates from one another to maintain the respective spacing between the porous ceramic plates.

14. The filter apparatus of claim 12, wherein the plurality of spacers include a first set of spacers that close the outer peripheral flow path from the first set of radial flow areas and a second set of spacers that close the central flow path from the second set of radial flow areas.

15. The filter apparatus of claim 12, wherein at least one of the plurality of spaced apart radial flow areas are divided into a plurality of radial flow channels arranged in a radial array about the central flow path.

16. The filter apparatus of claim 12, wherein each of the plurality of porous ceramic plates includes an inner periphery defining the corresponding central aperture, and the plurality of radial flutes have a first number of openings at an outer periphery that is greater than a second number of openings at the inner periphery of the at least one of the plurality of porous ceramic plates.

17. The filter apparatus of claim 12, wherein each of the radial flow areas has an axial width defined between a corresponding pair of the plurality of porous ceramic plates, wherein the axial width of at least one of the first set of radial flow areas is greater than the axial width of at least one of the second set of radial flow areas.

18. The filter apparatus of claim 12, wherein first sides of the plurality of porous ceramic plates have corresponding filter surface areas that are successively larger than one another in the axial direction.

19. The filter apparatus of claim 12, wherein the plurality of porous ceramic plates alternate in the axial direction between a first set of porous ceramic plates and a second set of porous ceramic plates, wherein each porous ceramic plate of the first set of plates includes an outer peripheral edge configured to nest within a corresponding porous ceramic plate of the second set of plates.

20. The filter apparatus of claim 12, wherein the plurality of porous ceramic plates alternate in the axial direction between a first set of porous ceramic plates and a second set of porous ceramic plates, wherein each porous ceramic plate of the first set of plates includes a central collar portion configured to be received within the central aperture of a corresponding porous ceramic plate of the second set of porous ceramic plates.

21. The filter apparatus of claim 12, wherein the apertures of the plurality of porous ceramic plates are successively smaller than one another in the axial direction.

22. The filter apparatus of claim 12, wherein the plurality of porous ceramic plates each include a filter profile defined between the first side and the second side of the porous ceramic plate selected from the group consisting of i) ceramic material composition, ii) porosity, iii) median pore diameter, iv) plate layering, v) catalyst loading, vi) the plate thickness being provided as a substantially constant plate thickness along a radial direction of the plate, vii) size of the central aperture, and viii) plate surface topography; and wherein at least two of the plurality of porous ceramic plates have substantially different filter profiles.

23. The filter apparatus of claim 22, wherein the filter profile is selected from the group consisting of i) ceramic material composition, ii) porosity, iii) median pore diameter, iv) plate layering, and v) catalyst loading, and wherein the filter profile of at least one of the plurality of porous ceramic plates substantially changes in the radial direction of the porous ceramic plate.

24. A filter apparatus comprising:
a housing including a first fluid port and a second fluid port,
a filter stack mounted within the housing and configured to filter a fluid stream between the fluid ports with the filter stack defining a central flow path in fluid communication with the first fluid port, wherein the filter apparatus includes an outer peripheral flow path in fluid communication with the second fluid port and defined between the filter stack and the housing,
the filter stack including a plurality of porous ceramic plates axially spaced from one another in an axial direction of the filter apparatus by a plurality of spacers to define a plurality of axially spaced apart radial flow areas, each porous ceramic plate including a thickness extending between a first side and a second side of the porous ceramic plate, and each porous ceramic plate further including a central aperture extending through the thickness of the plate, the central apertures of the porous ceramic plates positioned along the central flow path,
wherein the plurality of axially spaced apart radial flow areas alternate in the axial direction along the central flow path between a first set of radial flow areas open to the central flow path and closed to the outer peripheral flow path, and a second set of radial flow areas closed to the central flow path and open to the outer peripheral flow path, and
wherein the apertures of the plurality of porous ceramic plates are successively smaller than one another in the axial direction.

\* \* \* \* \*